US012696342B2

(12) United States Patent
Xu et al.

(10) Patent No.: US 12,696,342 B2
(45) Date of Patent: Jul. 28, 2026

(54) SYSTEMS AND METHODS FOR MULTICAST DATA TRAFFIC SERVICE CONTINUITY UNDER MULTICAST-BROADCAST SERVICES OPERATION DURING RADIO RESOURCE CONTROL STATE TRANSITION

(71) Applicant: APPLE INC., Cupertino, CA (US)

(72) Inventors: Fangli Xu, Beijing (CN); Yuqin Chen, Beijing (CN); Ralf Rossbach, Munich (DE); Naveen Kumar R Palle Venkata, San Diego, CA (US); Peng Cheng, Beijing (CN); Zhibin Wu, Los Altos, CA (US); Ping-Heng Kuo, London (GB); Haijing Hu, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 281 days.

(21) Appl. No.: 18/748,507

(22) Filed: Jun. 20, 2024

(65) Prior Publication Data

US 2025/0048486 A1 Feb. 6, 2025

Related U.S. Application Data

(60) Provisional application No. 63/517,537, filed on Aug. 3, 2023.

(51) Int. Cl.
*H04W 76/27* (2018.01)
*H04W 76/40* (2018.01)

(52) U.S. Cl.
CPC ........... *H04W 76/27* (2018.02); *H04W 76/40* (2018.02)

(58) Field of Classification Search
None
See application file for complete search history.

(56) References Cited

U.S. PATENT DOCUMENTS

2024/0008128 A1* 1/2024 Shrivastava ........ H04W 72/232
2024/0414503 A1* 12/2024 Kim ........................ H04W 4/06

FOREIGN PATENT DOCUMENTS

WO 2022149489 A1 7/2022
WO 2022211499 A1 10/2022

OTHER PUBLICATIONS

Kyocera, "Control plane aspects on multicast reception in RRC Inactive", R2-2306147 (Revision of R2-2303271 and R2-2303272) 3GPP TSG-RAN WG2 #122, Incheon, Korea, Agenda Item 7.11. 2.1, May 22-26, 2023, 11 pages.

* cited by examiner

*Primary Examiner* — Hong S Cho
(74) *Attorney, Agent, or Firm* — Dorsey & Whitney LLP

(57) ABSTRACT

Systems and methods for multicast data traffic service continuity under multicast-broadcast services (MBS) operation during a radio resource control (RRC) state or mode transition are described. In some embodiments, a user equipment (UE) receives, from a network, while in an RRC connected mode, an RRC release message comprising an RRC inactive mode point to multipoint (PTM) configuration that uses an MBS session to receive multicast data traffic while the UE is in an RRC inactive mode; enters the RRC inactive mode from the RRC connected mode in response to the RRC release message; and uses the RRC inactive mode PTM configuration to receive, from the network, the multicast data traffic of the MBS session while the UE is in the RRC inactive mode. Cases where a UE instead re-uses an RRC connected mode PTM configuration after transitioning to the RRC inactive mode are also described. Analogous network behaviors are described.

20 Claims, 19 Drawing Sheets

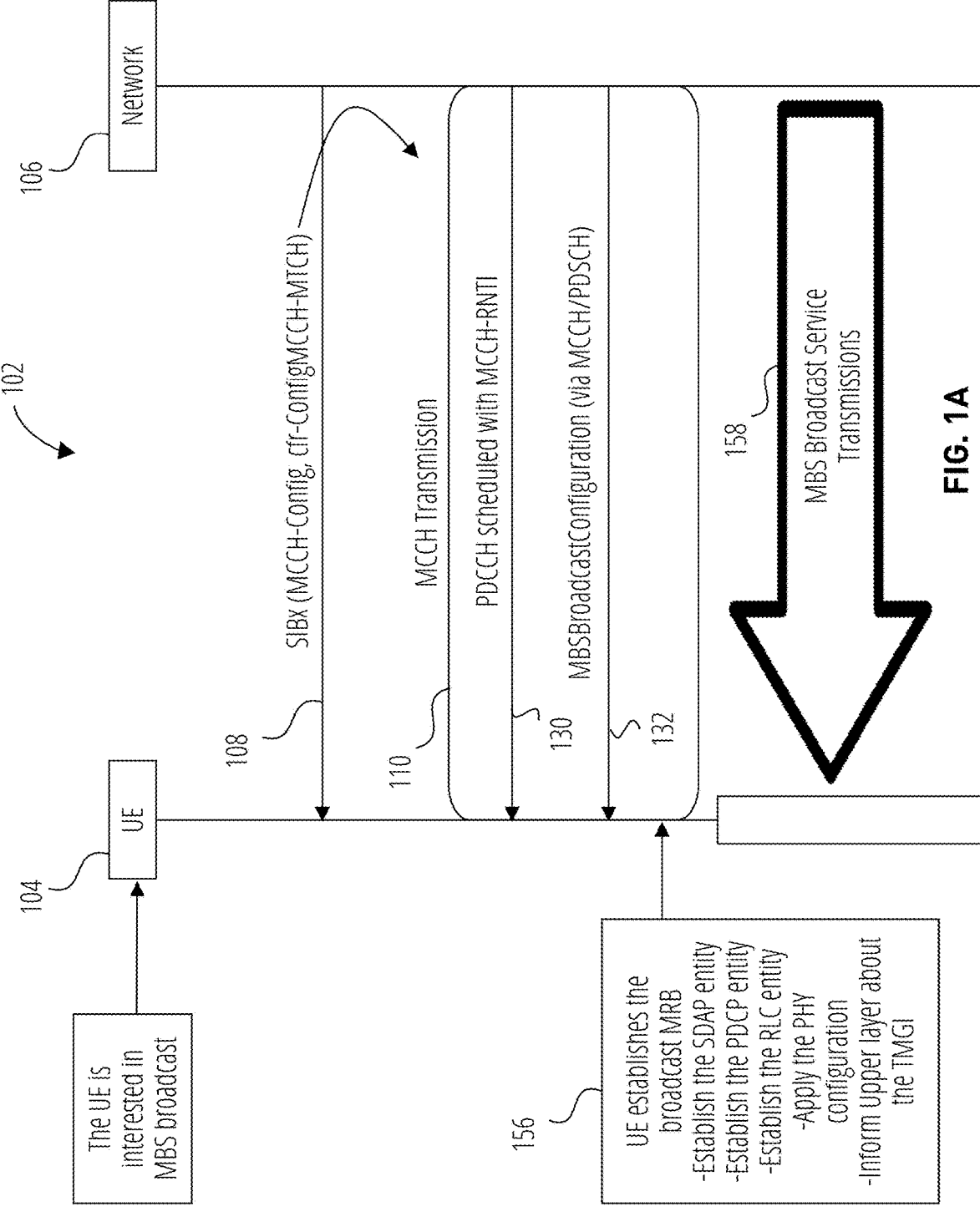

102

106 Network

104 UE

The UE is interested in MBS broadcast

108  SIBx (MCCH-Config, cfr-ConfigMCCH-MTCH)

110  MCCH Transmission

130  PDCCH scheduled with MCCH-RNTI

132  MBSBroadcastConfiguration (via MCCH/PDSCH)

156  UE establishes the broadcast MRB
-Establish the SDAP entity
-Establish the PDCP entity
-Establish the RLC entity
-Apply the PHY configuration
-Inform upper layer about the TMGI 158  MBS Broadcast Service Transmissions

FIG. 1A

```
112
MCCH-Config-r17 ::= SEQUENCE {
116    mcch-RepetitionPeriodAndOffset-r17
118    mcch-WindowStartSlot-r17
120    mcch-WindowDuration-r17
122    mcch-ModificationPeriod-r17

114
CFR-ConfigMCCH-MTCH-r17 ::= SEQUENCE {
124    locationAndBandwidthBroadcast-r17
126    pdsch-ConfigMCCH-r17
128    commonControlResourceSetExt-r17
```

```
402
  MRB-ToAddMod-r17 ::=           SEQUENCE {
    mbs-SessionId-r17    412        TMGI-r17
    mrb-Identity-r17                MRB-Identity-r17,
    mrb-IdentityNew-r17     414     MRB-Identity-r17          OPTIONAL,    -- Cond MRBSetup
    reestablishPDCP-r17            ENUMERATED{true}           OPTIONAL,    -- Need N
    recoverPDCP-r17               ENUMERATED{true}           OPTIONAL,    -- Need N
    pdcp-Config-r17               PDCP-Config                OPTIONAL,    -- Need N
    ...                                                      OPTIONAL,    -- Need N
  }                                                          OPTIONAL,    -- Cond PDCP
```

FIG. 4A

```
404
  MAC-CellGroupConfig ::=          SEQUENCE {
    ...
    g-RNTI-ConfigToAddModList-r17        SEQUENCE (SIZE (1..maxG-RNTI-r17)) OF
      MBS-RNTI-SpecificConfig-r17                   OPTIONAL,    -- Need N
    g-RNTI-ConfigToReleaseList-r17       SEQUENCE (SIZE (1..maxG-RNTI-r17)) OF
      MBS-RNTI-SpecificConfigId-r17                 OPTIONAL,    -- Need N
    g-CS-RNTI-ConfigToAddModList-r17     SEQUENCE (SIZE (1..maxG-CS-RNTI-r17))
      OF MBS-RNTI-SpecificConfig-r17               OPTIONAL,    -- Need N
    g-CS-RNTI-ConfigToReleaseList-r17    SEQUENCE (SIZE (1..maxG-CS-RNTI-r17))
      OF MBS-RNTI-SpecificConfigId-r17             OPTIONAL,    -- Need N
    allowCSI-SRS-Tx-MulticastDRX-Active-r17   BOOLEAN  OPTIONAL,  -- Need M
    ]],
    [[
    schedulingRequestID-PosMG-Request-r17 SchedulingRequestId  OPTIONAL,    -- Need R
    drx-LastTransmissionUL-r17            ENUMERATED {enabled}  OPTIONAL     -- Need R
    ]]
  }
```

FIG. 4B

```
BWP-DownlinkDedicated ::=       SEQUENCE {
    pdcch-Config          406        SetupRelease { PDCCH-Config }        OPTIONAL,    -- Need M
    pdsch-Config                     SetupRelease { PDSCH-Config }        OPTIONAL,    -- Need M
    sps-Config                       SetupRelease { SPS-Config }          OPTIONAL,    -- Need M
    radiolinkMonitoringConfig        SetupRelease { RadioLinkMonitoringConfig }  OPTIONAL,  -- Need M
    ...,
    [[
    sps-ConfigToAddModList-r16       SPS-ConfigToAddModList-r16           OPTIONAL,    -- Need N
    sps-ConfigToReleaseList-r16      SPS-ConfigToReleaseList-r16          OPTIONAL,    -- Need N
    sps-ConfigDeactivationStateList-r16  SPS-ConfigDeactivationStateList-r16  OPTIONAL,  -- Need R
    beamFailureRecoverySCellConfig-r16  SetupRelease {BeamFailureRecoveryRSConfig-r16}  OPTIONAL,  -- Cond SCellOnly
    sl-PDCCH-Config-r16              SetupRelease { PDCCH-Config }        OPTIONAL,    -- Need M
    sl-V2X-PDCCH-Config-r16          SetupRelease { PDCCH-Config }        OPTIONAL,    -- Need M
    ]],
    [[
    preConfGapStatus-r17             BIT STRING (SIZE (maxNrofGapId-r17)) OPTIONAL,    -- Cond PreConfigMG
    beamFailureRecoverySpCellConfig-r17  SetupRelease { BeamFailureRecoveryRSConfig-r16}  OPTIONAL,  -- Cond SpCellOnly
    harq-FeedbackEnablingforSPSactive-r17  BOOLEAN                        OPTIONAL,    -- Need R
    cfr-ConfigMulticast-r17          SetupRelease { CFR-ConfigMulticast-r17 }  OPTIONAL,  -- Need M
    dl-PPW-PreConfigToAddModList-r17  DL-PPW-PreConfigToAddModList-r17    OPTIONAL,    -- Need N
    dl-PPW-PreConfigToReleaseList-r17  DL-PPW-PreConfigToReleaseList-r17  OPTIONAL,    -- Need N
    nonCellDefiningSSB-r17           NonCellDefiningSSB-r17               OPTIONAL,    -- Need R
    servingCellMO-r17                MeasObjectId                         OPTIONAL     -- Cond MeasObject-NCD-SSB
    ]]
}
```

FIG. 4C

```
                              408
MBS-RNTI-SpecificConfig-r17 ::=    SEQUENCE {
    mbs-RNTI-SpecificConfigId-r17      MBS-RNTI-SpecificConfigId-r17,
    groupCommon-RNTI-r17               CHOICE {
        g-RNTI                            RNTI-Value,
        g-CS-RNTI                         RNTI-Value
    },
    drx-ConfigPTM-r17                  SetupRelease { DRX-ConfigPTM-r17 }   OPTIONAL,   -- Need M
    harq-FeedbackEnablerMulticast-r17  ENUMERATED {dci-enabler, enabled}   OPTIONAL,   -- Need S
    harq-FeedbackOptionMulticast-r17   ENUMERATED {ack-nack, nack-only}    OPTIONAL,   -- Cond HARQFeedback
    pdsch-AggregationFactor-r17        ENUMERATED {n2, n4, n8}             OPTIONAL,   -- Cond G-RNTI
    ...
```

FIG. 4D

```
DRX-ConfigPTM-r17 ::=        SEQUENCE {
    drx-onDurationTimerPTM-r17        CHOICE {
        subMilliSeconds              INTEGER (1..31),
        milliSeconds                 ENUMERATED {
            ms1, ms2, ms3, ms4, ms5, ms6, ms8, ms10, ms20, ms30, ms40, ms50, ms60,
            ms80, ms100, ms200, ms300, ms400, ms500, ms600, ms800, ms1000, ms1200,
            ms1600, spare8, spare7, spare6, spare5, spare4, spare3, spare2, spare1
        }
    },
    drx-InactivityTimerPTM-r17        ENUMERATED {
        ms0, ms1, ms2, ms3, ms4, ms5, ms6, ms8, ms10, ms20, ms30, ms40, ms50,
        ms60, ms80, ms100, ms200, ms300, ms500, ms750, ms1280, ms1920, ms2560,
        spare9, spare8, spare7, spare6, spare5, spare4, spare3, spare2, spare1
    },
    drx-HARQ-RTT-TimerDL-PTM-r17     INTEGER (0..56)   OPTIONAL,   -- Cond HARQFeedback
    drx-RetransmissionTimerDL-PTM-r17 ENUMERATED {
        sl0, sl1, sl2, sl4, sl6, sl16, sl24, sl33, sl40, sl64, sl80, sl96,
        sl112, sl128, sl160, sl320, spare15, spare14, spare13, spare12, spare11,
        spare10, spare9, spare8, spare7, spare6, spare5, spare4, spare3, spare2,
        spare1
    }                                                  OPTIONAL,   -- Cond HARQFeedback
    drx-LongCycleStartOffsetPTM-r17   CHOICE {
        ms10          INTEGER(0..9),
        ms32          INTEGER(0..31),
        ms60          INTEGER(0..59),
        ms70          INTEGER(0..69),
        ms128         INTEGER(0..127),
        ms256         INTEGER(0..255),
        ms512         INTEGER(0..511),
        ms1024        INTEGER(0..1023),
        ms2048        INTEGER(0..2047),
        ms5120        INTEGER(0..5119),
        ms20          INTEGER(0..19),
        ms40          INTEGER(0..39),
        ms64          INTEGER(0..63),
        ms80          INTEGER(0..79),
        ms160         INTEGER(0..159),
        ms320         INTEGER(0..319),
        ms640         INTEGER(0..639),
        ms1280        INTEGER(0..1279),
        ms2560        INTEGER(0..2559),
        ms10240       INTEGER(0..10239)
    },
    drx-SlotOffsetPTM-r17    INTEGER (0..31)
}
```

502
```
MRB-PDCP-ConfigBroadcast-r17 ::=  SEQUENCE {
    pdcp-SN-SizeDL-r17              ENUMERATED {len12bits}    OPTIONAL, -- Need S
    headerCompression-r17          CHOICE {
        notUsed                        NULL,
        rohc                           SEQUENCE {
            maxCID-r17                     INTEGER (1..16)           DEFAULT 15,
            profiles-r17                   SEQUENCE {
                profile0x0000-r17              BOOLEAN,
                profile0x0001-r17              BOOLEAN,
                profile0x0002-r17              BOOLEAN
            }
        }
    },
    t-Reordering-r17               ENUMERATED {ms1, ms10, ms40, ms160, ms500, ms1000, ms1250, ms2750}   OPTIONAL  -- Need S
}

MRB-RLC-ConfigBroadcast-r17 ::=  SEQUENCE {
    logicalChannelIdentity-r17     LogicalChannelIdentity,
    sn-FieldLength-r17             ENUMERATED (size6)         OPTIONAL,  -- Need S
    t-Reassembly-r17               t-Reassembly               OPTIONAL   -- Need S
}
```

RLC-BearerConfig ::=    SEQUENCE {
    logicalChannelIdentity      LogicalChannelIdentity,
    servedRadioBearer           CHOICE {
        srb-Identity                SRB-Identity,
        drb-Identity                DRB-Identity
    }
    reestablishRLC              ENUMERATED {true}                     OPTIONAL,   -- Cond LCH-SetupOnly
    rlc-Config                  RLC-Config                            OPTIONAL,   -- Need N
    mac-LogicalChannelConfig    LogicalChannelConfig                  OPTIONAL,   -- Cond LCH-Setup
    ...,                                                              OPTIONAL,   -- Cond LCH-Setup
    [[
    rlc-Config-v1610            RLC-Config-v1610                      OPTIONAL    -- Need R
    ]],
    [[
    rlc-Config-v1700            RLC-Config-v1700                      OPTIONAL,   -- Need R
    logicalChannelIdentityExt-r17  LogicalChannelIdentityExt-r17      OPTIONAL,   -- Cond LCH-SetupModMRB
    multicastRLC-BearerConfig-r17  MulticastRLC-BearerConfig-r17      OPTIONAL,   -- Cond LCH-SetupOnlyMRB
    servedRadioBearerSRB4-r17   SRB-Identity-v1700                    OPTIONAL    -- Need N
    ]]
}

MulticastRLC-BearerConfig-r17 ::=  SEQUENCE {
    servedMBS-RadioBearer-r17      MRB-Identity-r17,          606
    isPTM-Entity-r17               ENUMERATED {true}                  OPTIONAL    -- Need S
}

LogicalChannelIdentityExt-r17 ::=  INTEGER (320..65855)
```

```
PDCP-Config ::=          SEQUENCE {
    drb                      SEQUENCE {
        discardTimer             ENUMERATED {ms10, ms20, ms30, ms40, ms50, ms60, ms75,
                                 ms100, ms150, ms200, ms250, ms300, ms500,
                                 ms750, ms1500, infinity}
        pdcp-SN-SizeUL           ENUMERATED {len12bits, len18bits}         OPTIONAL,    -- Cond Setup
        pdcp-SN-SizeDL           ENUMERATED {len12bits, len18bits}         OPTIONAL,    -- Cond Setup1
        headerCompression        CHOICE {                                  OPTIONAL,    -- Cond Setup2
            notUsed                  NULL,
            rohc                     SEQUENCE {
                maxCID                   INTEGER (1..16383)                DEFAULT 15,
                profiles                 SEQUENCE {
                    profile0x0001            BOOLEAN,                      profile0x0002        BOOLEAN,
                    profile0x0003            BOOLEAN,                      profile0x0004        BOOLEAN,
                    profile0x0006            BOOLEAN,                      profile0x0101        BOOLEAN,
                    profile0x0102            BOOLEAN,                      profile0x0103        BOOLEAN,
                    profile0x0104            BOOLEAN
                },
                drb-ContinueROHC         ENUMERATED { true }              OPTIONAL      -- Need N
            },
            uplinkOnlyROHC           SEQUENCE {
                maxCID                   INTEGER (1..16383)                DEFAULT 15,
                profiles                 SEQUENCE {
                    profile0x0006            BOOLEAN
                },
                drb-ContinueROHC         ENUMERATED { true }              OPTIONAL      -- Need N
            },
            ...
        },
        integrityProtection      ENUMERATED { enabled }                   OPTIONAL,    -- Cond ConnectedTo5GC1
        statusReportRequired     ENUMERATED { true }                      OPTIONAL,    -- Cond Rlc-AM-UM
        outOfOrderDelivery       ENUMERATED { true }                      OPTIONAL     -- Need R
    },                                                                                 -- Cond DRB
    moreThanOneRLC           SEQUENCE {
        primaryPath              SEQUENCE {
            cellGroup                CellGroupId                          OPTIONAL,    -- Need R
            logicalChannel           LogicalChannelIdentity               OPTIONAL     -- Need R
        },
        ul-DataSplitThreshold    UL-DataSplitThreshold                    OPTIONAL,    -- Cond SplitBearer
        pdcp-Duplication         BOOLEAN                                  OPTIONAL,    -- Need R
    }                                                                                  -- Cond MoreThanOneRLC
}
```

FIG. 6B

```
t-Reordering              ENUMERATED {
                            ms0, ms1, ms2, ms4, ms5, ms8, ms10, ms15, ms20, ms30, ms40,
                            ms50, ms60, ms80, ms100, ms120, ms140, ms160, ms180, ms200, ms220,
                            ms240, ms260, ms280, ms300, ms500, ms750, ms1000, ms1250,
                            ms1500, ms1750, ms2000, ms2250, ms2500, ms2750,
                            ms3000, spare28, spare27, spare26, spare25, spare24,
                            spare23, spare22, spare21, spare20,
                            spare19, spare18, spare17, spare16, spare15, spare14,
                            spare13, spare12, spare11, spare10, spare09,
                            spare08, spare07, spare06, spare05, spare04, spare03,
                            spare02, spare01 }
...,
[[
cipheringDisabled         ENUMERATED {true}                               OPTIONAL     -- Cond ConnectedTo5GC
]],
[[
discardTimerExt-r16       SetupRelease { DiscardTimerExt-r16 }            OPTIONAL,    -- Cond DRB2
moreThanTwoRLC-DRB-r16    SEQUENCE {
    splitSecondaryPath-r16    LogicalChannelIdentity                      OPTIONAL,    -- Cond SplitBearer2
    duplicationState-r16      SEQUENCE (SIZE (3)) OF BOOLEAN              OPTIONAL     -- Need S
}                                                                         OPTIONAL,    -- Cond MoreThanTwoRLC-DRB
ethernetHeaderCompression-r16  SetupRelease { EthernetHeaderCompression-r16 }
                          OPTIONAL     -- Need M
]],
[[
survivalTimeStateSupport-r17   ENUMERATED {true}                         OPTIONAL,    -- Cond Drb-Duplication
uplinkDataCompression-r17      SetupRelease { UplinkDataCompression-r17 }
                          OPTIONAL,    -- Cond Rlc-AM
discardTimerExt2-r17      SetupRelease { DiscardTimerExt2-r17 }
                          OPTIONAL     -- Need M
initialRX-DELIV-r17       BIT STRING (SIZE (32))                          OPTIONAL     -- Cond MRB-Initialization
]]
```

FIG. 6C

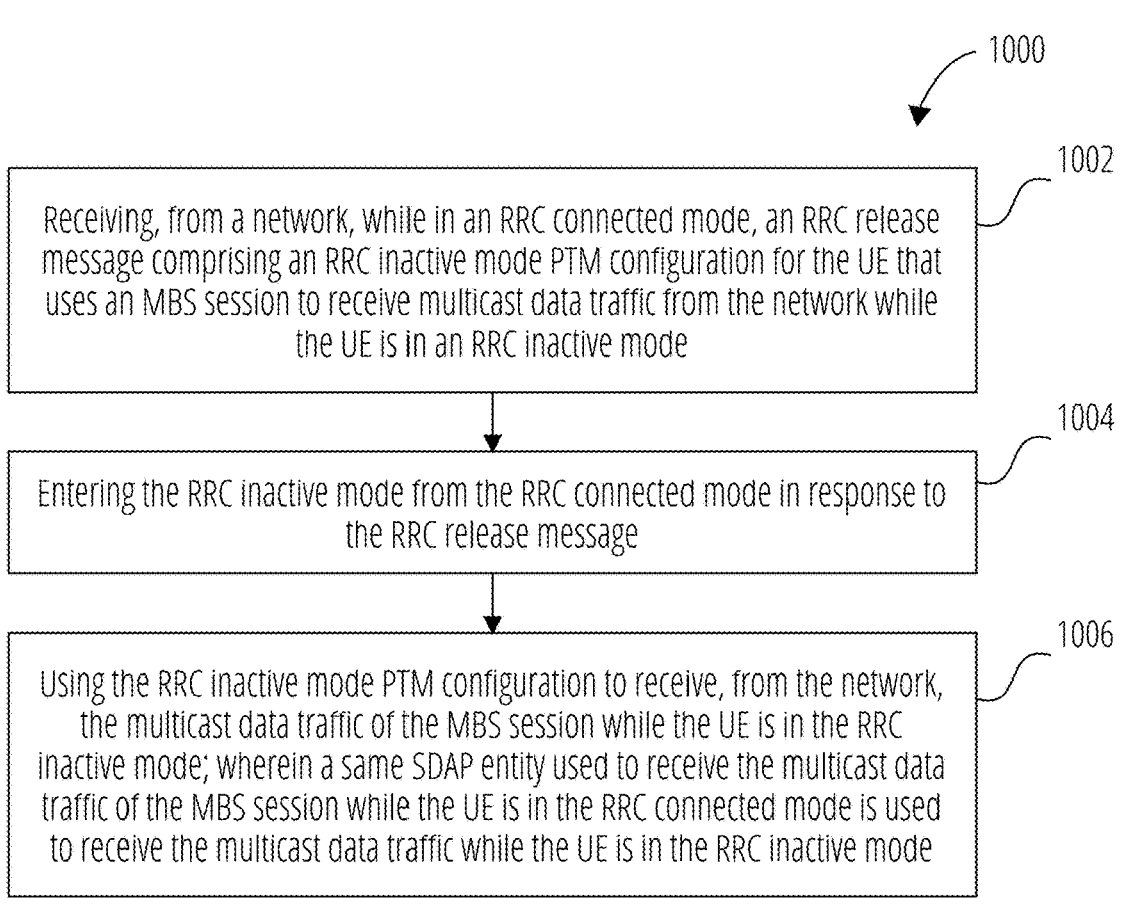

Receiving, from a network, while in an RRC connected mode, an RRC release message comprising an RRC inactive mode PTM configuration for the UE that uses an MBS session to receive multicast data traffic from the network while the UE is in an RRC inactive mode

1002

Entering the RRC inactive mode from the RRC connected mode in response to the RRC release message

1004

Using the RRC inactive mode PTM configuration to receive, from the network, the multicast data traffic of the MBS session while the UE is in the RRC inactive mode; wherein a same SDAP entity used to receive the multicast data traffic of the MBS session while the UE is in the RRC connected mode is used to receive the multicast data traffic while the UE is in the RRC inactive mode

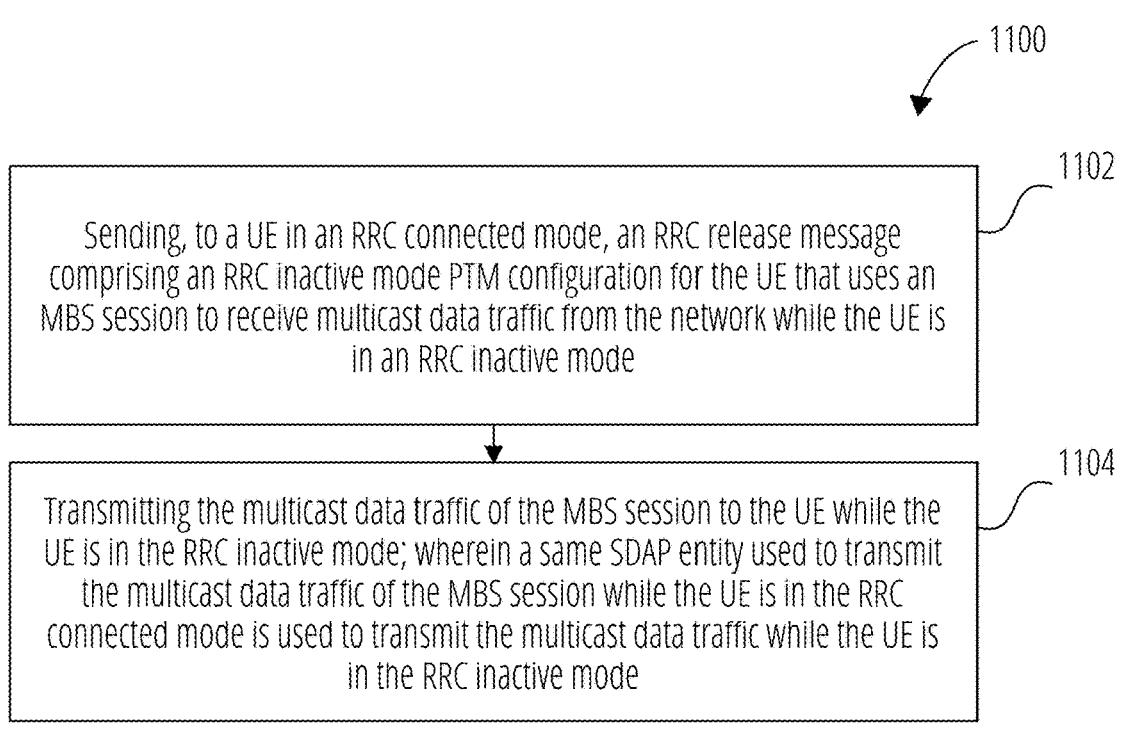

Sending, to a UE in an RRC connected mode, an RRC release message comprising an RRC inactive mode PTM configuration for the UE that uses an MBS session to receive multicast data traffic from the network while the UE is in an RRC inactive mode

1102

Transmitting the multicast data traffic of the MBS session to the UE while the UE is in the RRC inactive mode; wherein a same SDAP entity used to transmit the multicast data traffic of the MBS session while the UE is in the RRC connected mode is used to transmit the multicast data traffic while the UE is in the RRC inactive mode

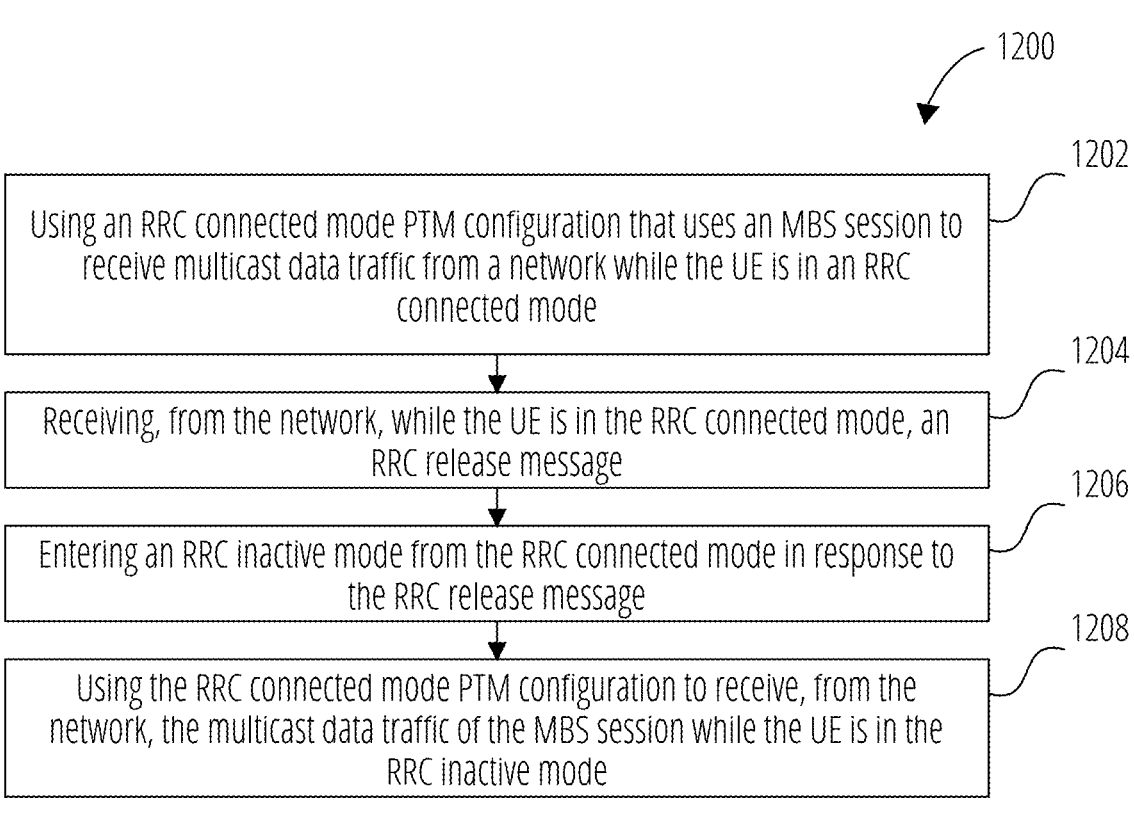

1200

1202

Using an RRC connected mode PTM configuration that uses an MBS session to receive multicast data traffic from a network while the UE is in an RRC connected mode

1204

Receiving, from the network, while the UE is in the RRC connected mode, an RRC release message

1206

Entering an RRC inactive mode from the RRC connected mode in response to the RRC release message

1208

Using the RRC connected mode PTM configuration to receive, from the network, the multicast data traffic of the MBS session while the UE is in the RRC inactive mode

FIG. 12

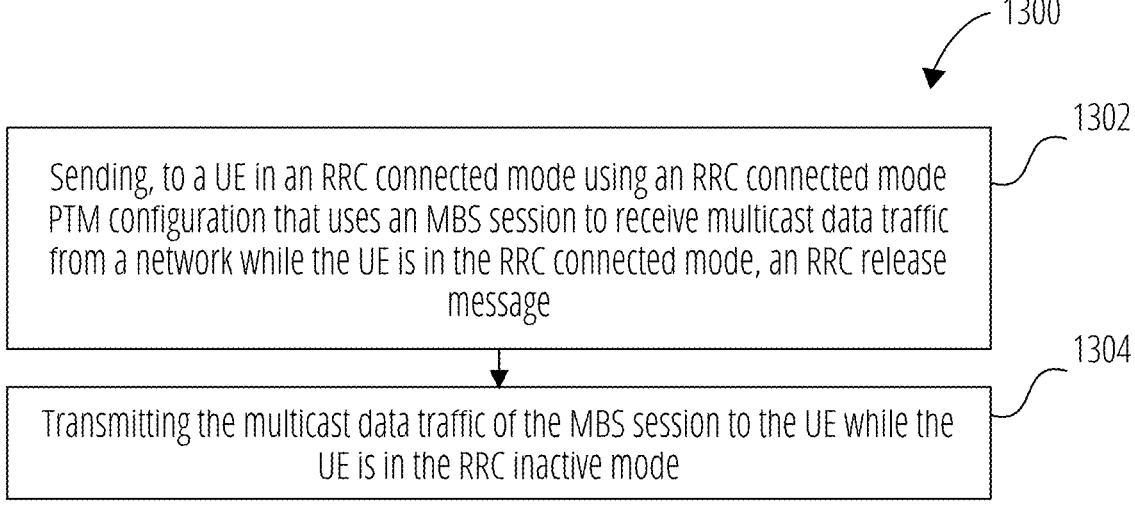

1300

1302

Sending, to a UE in an RRC connected mode using an RRC connected mode PTM configuration that uses an MBS session to receive multicast data traffic from a network while the UE is in the RRC connected mode, an RRC release message

1304

Transmitting the multicast data traffic of the MBS session to the UE while the UE is in the RRC inactive mode

FIG. 13

SYSTEMS AND METHODS FOR MULTICAST DATA TRAFFIC SERVICE CONTINUITY UNDER MULTICAST-BROADCAST SERVICES OPERATION DURING RADIO RESOURCE CONTROL STATE TRANSITION

TECHNICAL FIELD

This application relates generally to wireless communication systems, including wireless communication systems that communicate multicast data traffic according to multicast-broadcast services (MBS) arrangements.

BACKGROUND

Wireless mobile communication technology uses various standards and protocols to transmit data between a base station and a wireless communication device. Wireless communication system standards and protocols can include, for example, 3rd Generation Partnership Project (3GPP) Long Term Evolution (LTE) (e.g., 4G), 3GPP New Radio (NR) (e.g., 5G), and Institute of Electrical and Electronics Engineers (IEEE) 802.11 standard for Wireless Local Area Networks (WLAN) (commonly known to industry groups as Wi-Fi®).

As contemplated by the 3GPP, different wireless communication systems' standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, Global System for Mobile communications (GSM), Enhanced Data Rates for GSM Evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements Universal Mobile Telecommunication System (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC) while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a flow diagram for an MBS broadcast configuration between a UE and a base station, according to embodiments discussed herein.

FIG. 4A through FIG. 4E illustrate various IEs that are used as/are considered an MBS configuration within an MBS multicast service scenario, assuming an RRC connected mode, according to embodiments herein.

FIG. 5 illustrates an MRB PDCP configuration IE that may be used in a configuration for MBS broadcast services.

FIG. 6A illustrates an RLC bearer configuration IE that may be used in a configuration for MBS multicast services, while FIG. 6B and FIG. 6C together illustrate a PDCP configuration IE that may be used in a configuration for MBS multicast services.

FIG. 10 illustrates a method of a UE, according to embodiments discussed herein.

FIG. 11 illustrates a method of a RAN, according to embodiments discussed herein.

FIG. 12 illustrates a method of a UE, according to embodiments discussed herein.

FIG. 13 illustrates a method of a RAN, according to embodiments discussed herein.

DETAILED DESCRIPTION

Figure 1B:
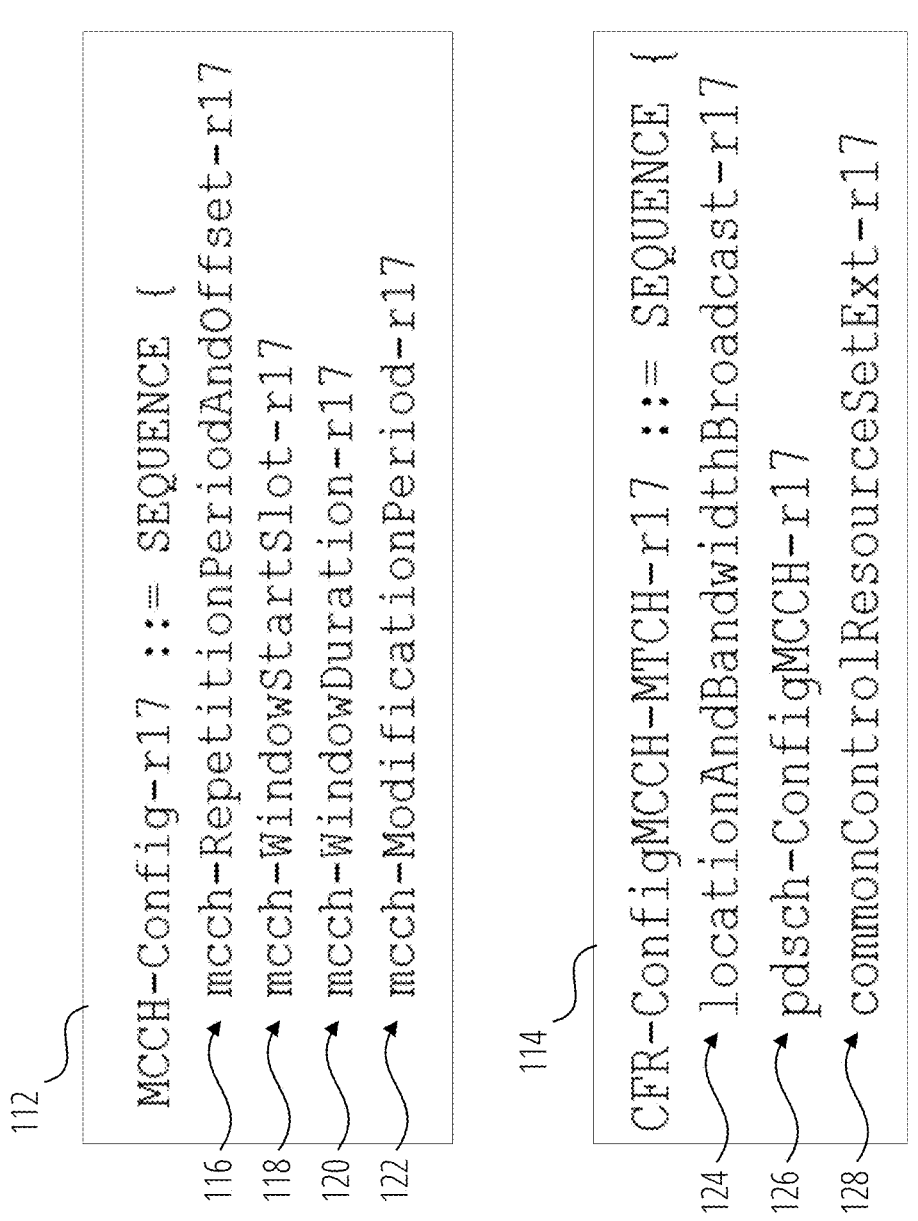
FIG. 1B illustrates an MCCH-Config IE and a CFR-ConfigMCCH-MTCH IE as may be present in a SIB according to a 2-step MBS broadcast configuration, according to some embodiments.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Enhancements to multicast/broadcast functions as found as part of a multicast-broadcast services (MBS) implementation (e.g., a 3GPP NR Release 17 (Rel-17) MBS implementation) in a wireless communication system may be considered. As part of such consideration, it may be that support for multicast reception by UEs that are in a radio resource control (RRC) inactive state or mode (RRC_INACTIVE) may be specified. As part of this specification, aspects of point to multipoint (PTM) configuration for UEs receiving multicast data traffic while in an RRC inactive mode may be considered. Further, impacts on mobility and/or state transitions for UEs receiving multicast data traffic while in an RRC inactive mode may be considered.

Other enhancements for MBS multicast/broadcast functions may include consideration of Uu signaling enhancements to allow a UE to use shared processing for both MBS broadcast and MBS unicast reception, including, for example, UE capability and related assistance information reporting regarding simultaneous unicast reception while the UE is in an RRC connected state or more (RRC_CONNECTED) and MBS broadcast reception from the same or different operators. Still further enhancements may relate to improvements for resource efficiency for MBS reception in RAN sharing scenarios.

Herein, MBS broadcast services and MBS multicast services are discussed, compared and contrasted, etc. In various wireless communication systems implementing MBS services (e.g., various 3GPP wireless communications systems), an MBS broadcast service is a first type of MBS service, while an MBS multicast service is a second (different) type of MBS service. For example, an MBS broadcast service may not require a UE to join an associated session in order to receive associated data traffic, while this may be required in the case of an MBS multicast service. As is discussed in some detail herein, an MBS broadcast services and an MBS multicast service may be configured in differing ways.

Embodiments of MBS Broadcast Services

FIG. 1A illustrates a flow diagram 102 for an MBS broadcast configuration between a UE 104 and a network 106 (e.g., a base station of the network), according to embodiments discussed herein. The flow diagram 102 may correspond to, for example, a 3GPP Rel-17 MBS broadcast configuration.

The flow diagram 102 may represent a 2-step MBS broadcast configuration acquisition for the UE 104 while the UE is in any of the RRC connected mode, an RRC idle mode (RRC_IDLE, also sometimes referred to as an RRC idle state), and/or an RRC inactive mode. As illustrated, the UE 104 first receives the MBS configuration for the MBS broadcast session that occurs via a multimedia broadcast/multicast service (MBMS) point to multipoint control channel (MCCH) on a SIB 108 (shown in the flow diagram 102 as "SIBx").

FIG. 1B illustrates an MCCH-Config information element (IE) 112 and a CFR-ConfigMCCH-MTCH IE 114 as may be present in a SIB (e.g., the SIB 108) according to a 2-step MBS broadcast configuration, according to some embodiments. The MCCH-Config IE 112 and the CFR-ConfigMCCH-MTCH IE 114 are illustrated here as arranged according to some 3GPP NR Rel-17 embodiments.

As illustrated, the MCCH-Config IE 112 provides the UE with MCCH repetition period and offset information 116, MCCH window start slot information 118, MCCH window duration information 120, and MCCH modification period information 122.

Further, the CFR-ConfigMCCH-MTCH IE 114 provides the UE with location and bandwidth broadcast information 124, physical downlink shared channel (PDSCH) configuration for MCCH information 126, and common control resource set information 128.

Returning to the flow diagram 102 of FIG. 1A, after receiving the SIB 108, the UE then receives a corresponding MCCH transmission 110 (according to the MCCH configuration which was provided in the SIB 108). As illustrated, the MCCH transmission 110 may include a physical downlink control channel (PDCCH) 130 that was scheduled using an MCCH radio network temporary identifier (MCCH-RNTI) and an MBS broadcast configuration 132 (that arrives via MCCH/PDSCH).

An MBS broadcast configuration as found in the MCCH transmission 110 provides the list of all broadcast services with ongoing sessions transmitted on multicast traffic channel(s) (MTCH(s)) and associated information for a broadcast session (e.g., an MBS session identifier (ID), a group radio network temporary identifier (RNTI) (G-RNTI) and scheduling info, neighbor cell information for MTCH, etc.).

Figure 1C:
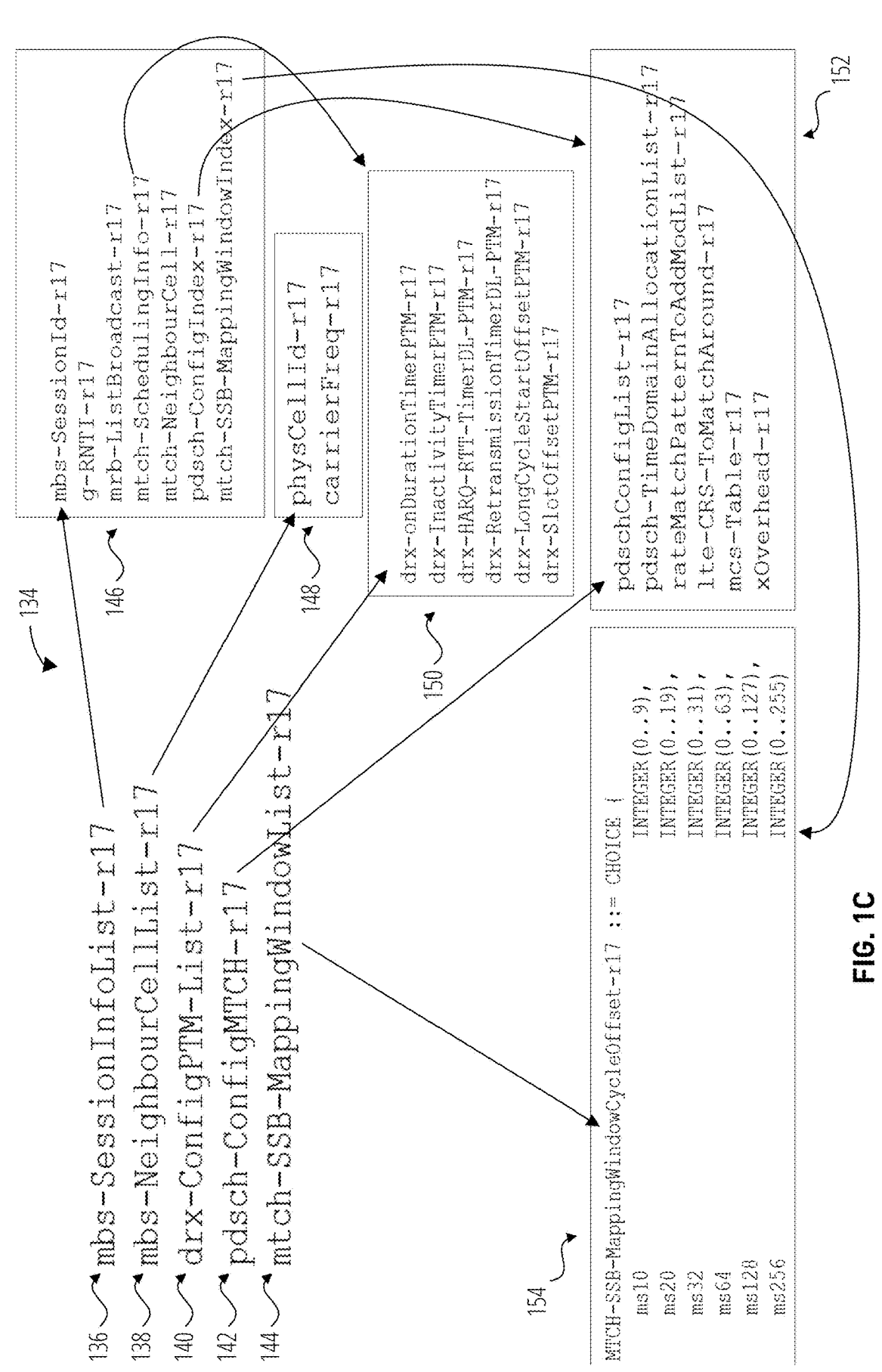
FIG. 1C illustrates configuration information that may be present in an MCCH transmission, according to embodiments discussed herein.

FIG. 1C illustrates configuration information 134 that may be present in an MCCH transmission 110, according to embodiments discussed herein. As illustrated, the MCCH transmission 110 may include an MBS session information list IE 136, an MBS neighbor cell list IE 138, a discontinuous reception (DRX) configuration PTM list IE 140, a PDSCH configuration for MTCH IE 142, and an MTCH to synchronization signal block (SSB) mapping window list IE 144.

The MBS session information list IE 136 may correspond to first IEs 146, which may include an MBS session ID IE, a G-RNTI IE, an MBS radio bearer (MRB) list broadcast IE, an MTCH scheduling information IE, an MTCH neighbor cell IE, a PDSCH configuration index IE, and an MTCH to SSB mapping window index IE, as illustrated.

The MBS neighbor cell list IE 138 may correspond to second IEs 148, which may include a physical cell ID IE and a carrier frequency IE, as illustrated.

The DRX configuration PTM list IE 140 may correspond to third IEs 150, which may include a DRX on duration timer for PTM IE, a DRX inactivity timer for PTM IE, a DRX hybrid automatic repeat request (HARQ) round trip time (RTT) timer for downlink for PTM IE, a DRX retransmission timer for downlink for PTM IE, a DRX long cycle starting offset for PTM IE, and a DRX slot offset for PTM IE, as illustrated.

The PDSCH configuration for MTCH IE 142 may correspond to fourth IEs 152, which may include a PDSCH configuration list IE, a PDSCH time domain allocation list IE, a rate matching pattern to add modification list IE, a modulation and coding scheme (MCS) table IE, and an X-overhead IE, as illustrated.

The MTCH to SSB mapping window list IE 144 may correspond to an MTCH to SSB mapping window cycle offset IE 154, as illustrated.

As noted with arrows in FIG. 1C, the MTCH scheduling information IE of the first IEs 146 may be understood to relate to the third IEs 150, the PDSCH configuration index IE of the first IEs 146 may be understood to relate to the fourth IEs 152, and the MTCH to SSB mapping window index IE of the first IEs 146 may be understood to relate to the MTCH to SSB mapping window cycle offset IE 154, as illustrated.

Returning again to the flow diagram 102 of FIG. 1A: Upon receiving the MCCH transmission 110, as illustrated, the UE establishes 156 the broadcast MRB for the respective MRB session. The UE does this without reference/without using any MRB indicated by the network (note that MRB information was not provided in the MCCH transmission 110). As part of this process, the UE establishes the corresponding service data adaptation protocol (SDAP) entity, the corresponding packet data convergence protocol (PDCP) entity, and the corresponding radio link control (RLC) entity. Further, the UE applies the appropriate physical layer (PHY) configuration and informs upper layers about a corresponding temporary mobile group identity (TMGI).

The UE then proceeds to receive MBS broadcast service transmissions 158 going forward, as illustrated.

Embodiments of MBS Multicast Services

In some wireless communication systems, a UE may continue receiving MBS multicast service(s) via PTM or point to point (PTP) in a new cell during a handover.

Figures 2A, 2B:
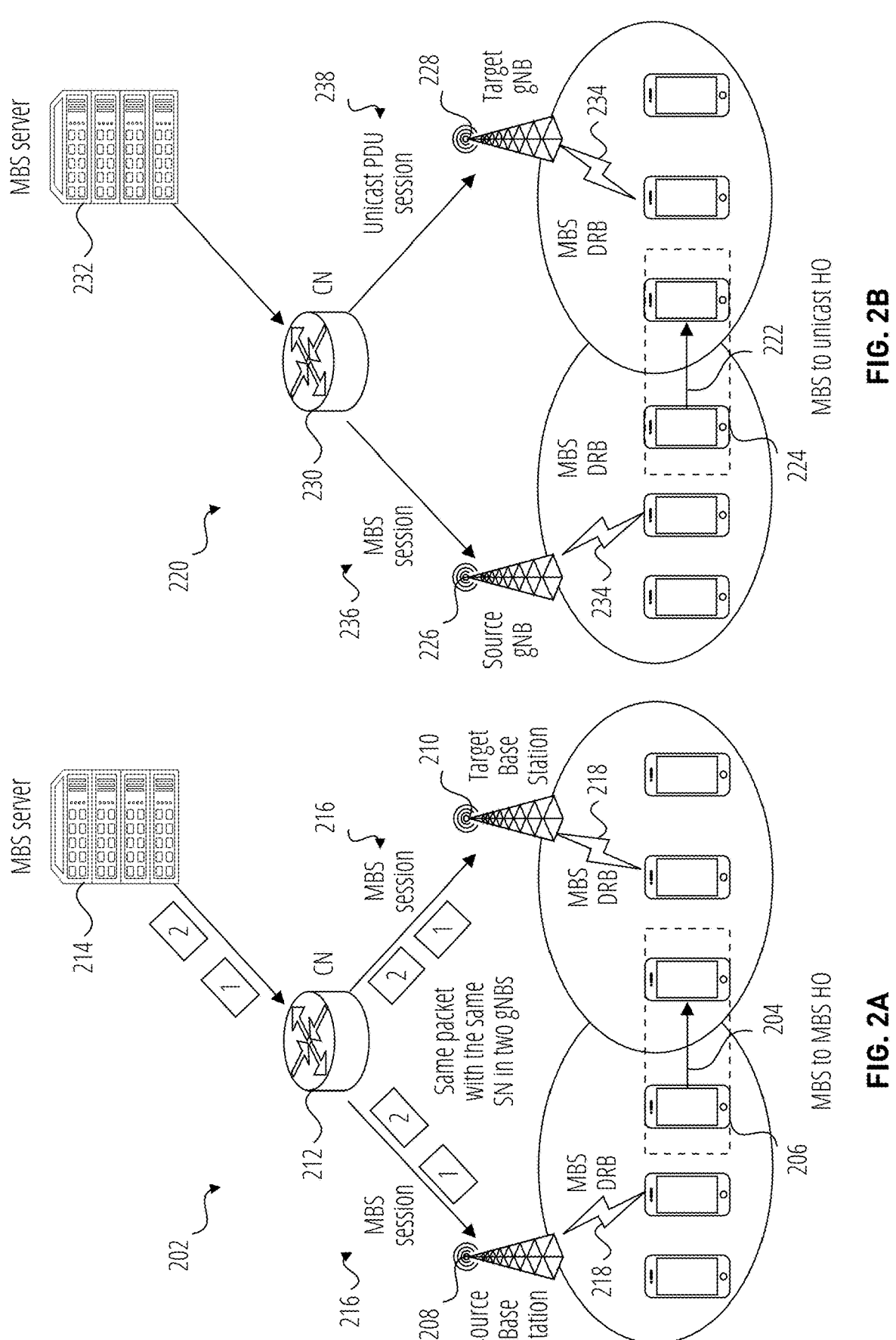
FIG. 2A illustrates a diagram corresponding to an MBS to MBS handover of a UE from a source base station to a target base station, according to some embodiments.
FIG. 2B illustrates a diagram corresponding to an MBS to unicast handover of a UE from a source base station to a target base station, according to some embodiments.

FIG. 2A illustrates a diagram 202 corresponding to an MBS to MBS handover 204 of a UE 206 from a source base station 208 to a target base station 210, according to some embodiments. As illustrated, the CN 212 receives data packets (labelled "1" and "2" in FIG. 2A) from an MBS server 214 for distribution according to the MBS session 216 of the MBS multicast service. Copies of these same data packets (with the same sequence number (SN) within the MBS session 216) are delivered by the CN 212 to each of the source base station 208 and the target base station 210. Because of this, both the source base station 208 and the target base station 210 are equipped to provide the UE 206 with data traffic on the MBS data radio bearer (DRB) 218 (or MRB 218) corresponding to the MBS session 216, such that the receipt of data traffic over the MBS multicast service is seamless with respect to the (arbitrary) timing of the MBS to MBS handover 204.

FIG. 2B illustrates a diagram 220 corresponding to an MBS to unicast handover 222 of a UE 224 from a source base station 226 to a target base station 228, according to some embodiments. As illustrated, the CN 230 receives data packets from an MBS server 232 for distribution according to the MBS session 236 of the MBS multicast service. Copies of these same data packets (according to the MBS session 236) are delivered by the CN 230 to the source base station 226, and copies of those data packets (refactored for the unicast protocol data unit (PDU) session 238) are delivered by the CN 212 to the target base station 210. Because of this, both the source base station 208 and the target base station 210 are equipped to provide the UE 206 with data traffic on the MBS DRB 234 (or MRB 234), such that the receipt of data traffic over the MBS multicast service is seamless with respect to the (arbitrary) timing of the MBS to unicast handover 222.

Note that in definitions for some wireless communication systems, the lossless handover for the MBS multicast service is supported for at least for the PTP to PTP case. Further, it may be that downlink (DL) PDCP SN synchronization and continuity between the source and the target cell needs to be guaranteed. Accordingly, it may be in some cases that the source base station may forward the data to the target base station, and that the target base station may then deliver the forwarded data. The UE may be configured by the network to provide a PDCP status report for an MRB for a multicast session during handover.

Figure 3:
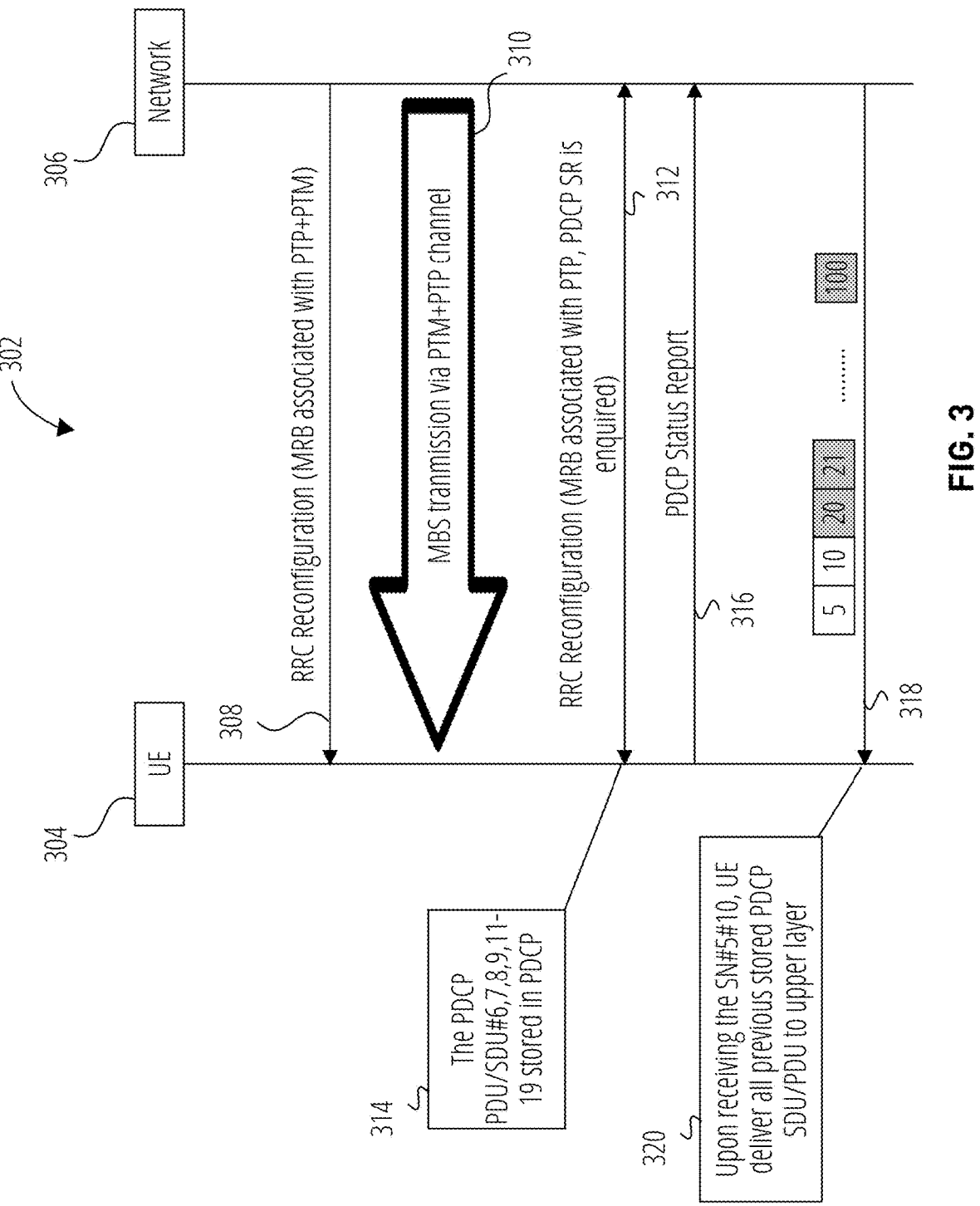
FIG. 3 illustrates a flow diagram for signaling between a UE and a network serving the UE during an MRB bearer type change, according to embodiments discussed herein.

To minimize loss during an MRB bearer type change, the network (e.g., via a base station) may configure a UE to send a PDCP status report upon an MRB bearer type change (e.g., from PTM to PTP). FIG. 3 illustrates a flow diagram 302 for signaling between a UE 304 and a network 306 serving the UE during an MRB bearer type change, according to embodiments discussed herein.

As illustrated in FIG. 3, the network 306 first sends a first RRC reconfiguration message 308 to the UE 304. As illustrated, the first RRC reconfiguration message 308 may include information regarding an MRB (e.g., an MRB ID) to use with a PTP and PTM MBS multicast service between the UE 304 and the network 306.

The network 306 then performs the MBS transmission 310 toward the UE (and the UE receives the MBS transmission 310) per the information in the first RRC reconfiguration message 308.

The network then sends the UE 304 a second RRC reconfiguration message 312. The second RRC reconfiguration message 312 may correspond to, for example, a bearer type change. As illustrated, the second RRC reconfiguration message 312 includes information regarding the MRB (e.g., an MRB ID) of the MBS session for which the network wishes to use seamlessly across the MRB bearer type change. The MRB in question may be the same MRB discussed in relation to the first RRC reconfiguration message 308, which is now configured with a PTP (only) configuration through which the service continuity will be provided going forward. Further, as illustrated, the second RRC reconfiguration message 312 may also include an inquiry for the UE 304 to provide a PDCP status report (SR) to the network 306.

Upon receiving the second RRC reconfiguration message 312, the UE stores 314 various in-progress PDCP PDU/service data unit (SDU) data packets (the example of FIG. 3 relates that packets having SNs 6, 7, 8, 9, and 11-19 are stored) at the PDCP layer of the UE 304, preparatory to the upcoming MRB bearer type change.

The UE 304 then sends the PDCP status report 316 to the network. The PDCP status report 316 informs the network of the current PDCP status at the UE (e.g., which data packets have been received already by the UE 304) such that the network is equipped to resume the MBS session through MRB and according to the PTP (only) configuration at the appropriate packet range.

Based on the PDCP status report 316, the network 306 sends the UE 304 the appropriate range of PDCP data packets 318 (the example of FIG. 3 uses packets having SNs 5, 10, and 20-100 and onward) on the MRB according to the new PTP (only) configuration. The UE is configured to properly receive these data packets based on a preservation of the same MRB and same MBS context for use as provided to the UE 304 in the second RRC reconfiguration message 312.

Upon receiving 320 the packets having SNs 5 and 10 from the network 306, the UE delivers all previously stored PDCP SDU/PDU packets (e.g., the packets having SNs 6, 7, 8, 9, and 11-19) to upper layers and then proceeds to receive new PDCP SDU/PDU packets (e.g., the packets having SN 20-100 and onward) from the network 306 using the new PTP (only) configuration, again by using the MRB and MBS context that were preserved via information found in the second RRC reconfiguration message 312.

In some wireless communication systems, a network provides an MBS configuration for multicast cases via an RRC reconfiguration message. Such configuration messaging may include the various parts. A first part of MBS configuration messaging may include an MRB configuration in a RadioBearerConfig IE. A second part of MBS configuration messaging may include a PTM related G-RNTI and a DRX configuration in a MAC-CellGroupConfig IE. A third part of MBS configuration messaging may include a PTM PDCCH/PDSCH configuration in a common frequency resource (CFR) configuration within each bandwidth part (BWP) DL configuration. A fourth part of MBS configuration messaging may include HARQ feedback related configuration information in a BWP configuration.

FIG. 4A through FIG. 4E illustrate various IEs that are used as/are considered an MBS configuration within an MBS multicast service scenario, assuming an RRC connected mode, according to embodiments herein. FIG. 4A illustrates an MRB to add modification IE 402, FIG. 4B illustrates a MAC cell group configuration IE 404, FIG. 4C illustrates a BWP downlink dedicated IE 406, FIG. 4D illustrates an MBS RNTI specific configuration IE 408, and FIG. 4E illustrates a DRX configuration for PTM IE 410. The IEs of FIG. 4A through FIG. 4E are provided for illustrative purposes (e.g., for comparison with the configuration IEs for MBS configuration information that may be provided attendant to MBS broadcast service scenarios, as provided herein), and as such not all details of each such IE are explicitly described here.

It is noted with particularity that the MRB to add modification IE 402 of FIG. 4A includes the MRB identity IE 412 and the MRB identity IE 414, either of which may act to inform the UE of a relevant (e.g., prior) MRB ID that is to be continued to be used during the (new/newly configured) MBS multicast services corresponding to this configuration information. It is noted that analogous such IEs (or IEs having the same information) may not be present in configurations for MBS broadcast services in some wireless communication networks (e.g., refer to discussion of such configuration for MBS broadcast services as presented above).

In other words, with respect to some wireless communication systems (e.g., some 3GPP NR wireless communication systems), it will be understood that, among other things, MRB use, behavior, and implementation as between configurations for MBS broadcast services and configurations for MBS multicast services are different. As discussed, it may be that MRB ID information is only provided in cases of configurations MBS multicast services, but not in the case of configurations for MBS broadcast services. Accordingly, the MRB structure is different for different MRB types.

With respect to such circumstances, it may be said that the configuration of MRB for use with MBS multicast services is accordingly richer than that of the configuration of MRB MBS broadcast services. FIG. 5 illustrates an MRB PDCP configuration IE 502 that may be used in a configuration for MBS broadcast services. As will be seen upon review, no mechanism for communicating an MRB ID or other MRB-wise information is provided in the MRB PDCP configuration IE 502.

FIG. 6A illustrates an RLC bearer configuration IE 602 that may be used in a configuration for MBS multicast services, while FIG. 6B and FIG. 6C together illustrate a PDCP configuration IE 604 that may be used in a configuration for MBS multicast services. As may be seen, the RLC bearer configuration IE 602 includes an MRB identity IE 606 identifying an MRB as part of the configuration for MBS multicast services (which is not the case for the configuration for MBS broadcast services as explained in relation to FIG. 5).

For some (e.g., prospective) wireless communication systems, it may be understood that, as a baseline, a PTM configuration for an RRC inactive mode that is provided in an RRC release message with "suspendconfig" for a multicast MTCH (or MBS configuration information) may follow a form that is used for an MBS broadcast configuration. Under such circumstances, the handling of existing MRBs of the MBS session upon/after the attendant transition to an RRC inactive mode may be undefined.

It is noted that with respect to MBS configuration structures, the MBS broadcast configuration only supports full configuration. Further, in various MBS broadcast services cases, the network does may not provide the UE with an explicit MRB ID configuration (e.g., as is discussed elsewhere herein). Finally, in present systems, service continuity in multicast cases may be based on the preservation/continued use at the UE of an MRB with the same MRB ID as previously used, or at least an otherwise explicitly identified associated MRB ID to the original MRB.

Under such circumstances, when an MBS broadcast configuration is re-used with respect to a transition to an RRC inactive mode in MBS multicast services cases as has been proposed, the result is that the operative multicast MRB configuration in RRC connected mode versus RRC inactive mode is different, at least in that the configuration information in the RRC inactive mode would accordingly not include MRB information. This may result in the inability to achieve service continuity based on MRB in the case of transition from an RRC connected mode to an RRC inactive mode.

With respect to resolving the different multicast MRB configuration/structure as between RRC inactive mode and RRC connected mode, the following two issues may be considered with respect to an RRC state transition at a UE from an RRC connected mode to an RRC inactive mode. A first issue relates to defining the manner of handling differences in the multicast MRB configuration as between the RRC connected and RRC inactive modes. A second issue relates to the manner of supporting MBS multicast service continuity during a transition from an RRC connected mode to an RRC inactive mode.

With respect to these issues, various proposals are considered herein. If a first proposal, it is contemplated that the UE keeps PTM configurations for multicast reception for the RRC connected mode and for the RRC inactive mode separately. In a second proposal, the MBS session for the RRC inactive mode multicast reception is configured by RRC dedicated signaling. In such cases, the network provides MBS session information for use in the RRC inactive mode to the UE before/when the UE enters the RRC inactive mode. In a third proposal, MRB level or MBS session level service continuity during an RRC state transition may be supported. It is noted that MRB level service continuity may use an MRB ID provided that is provided in an inactive PTM configuration (as is described herein).

Figure 7:
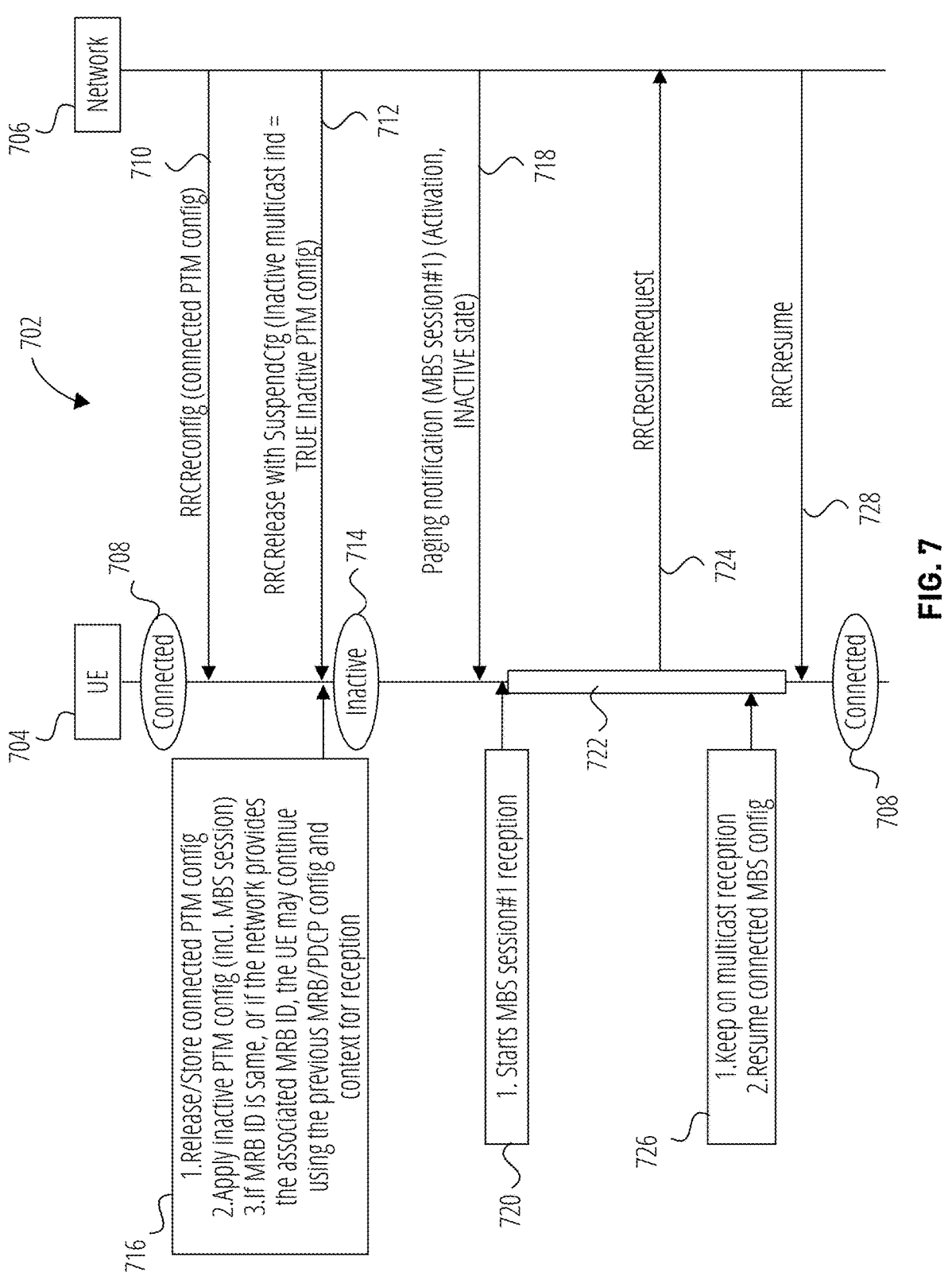
FIG. 7 illustrates a flow diagram of a method for service continuity for data traffic of an MBS multicast service between a UE and a network, according to embodiments herein.

FIG. 7 illustrates a flow diagram 702 of a method for service continuity for data traffic of an MBS multicast service between a UE 704 and a network 706, according to embodiments herein. Preliminarily, the UE 704 may be in an RRC connected mode 708. While the UE is in the RRC connected mode 708, the network 706 may send the UE 704 an RRC reconfiguration message 710 that provides the UE with an RRC connected mode PTM configuration. The UE may use the RRC connected mode PTM configuration to receive data traffic of the multicast MBS service while it is in the RRC connected mode 708.

The network 706 then sends the UE 704 an RRC release message 712. This RRC release message 712 may include a configuration suspension indication, as illustrated. In response to the RRC release message 712, the UE 704 will enter the RRC inactive mode 714.

The RRC release message 712 includes an indication that the UE 704 is to continue to receive multicast data traffic of the MBS session while in the RRC inactive mode 714. Further, the RRC release message 712 includes an RRC inactive mode PTM configuration that the UE is to use to receive the multicast data traffic of the MBS session while the UE 704 is in the RRC inactive mode 714.

Upon receiving the RRC release message 712, the UE 704 reacts 716 in one or more ways. First, the UE 704 may either release or store the RRC connected mode PTM configuration. Further, the UE 704 applies the RRC inactive mode PTM configuration (including any MBS session information in that RRC inactive mode PTM configuration).

Finally, in cases where the RRC inactive mode PTM configuration indicates either an MRB ID that identifies a same MRB of the RRC connected mode PTM configuration or an MRB ID that is different than but associated with an MRB of the RRC connected mode PTM configuration, the UE 704 may arrange to use the identified MRB (and, e.g., the associated PDCP configuration and context) for reception of multicast data traffic of the MBS session while the UE is in the RRC inactive mode 714. Consistent with disclosure herein, this aspect can be leveraged to provide continuity for multicast data traffic of the MBS session at an MRB level as between the RRC connected mode and the RRC inactive mode.

After the UE 704 is in the RRC inactive mode 714, the network 706 provides the UE 704 with a paging notification 718. The paging notification 718, as illustrated, identifies the MBS session and indicates to the UE to activate the RRC inactive mode PTM configuration for the MBS session such that multicast data traffic of the MBS session may be received by the UE 704 while the UE 704 is in the RRC inactive mode.

In response, the UE 704 starts 720 to receive multicast data traffic 722 of the MBS session using the RRC inactive mode PTM configuration.

At a later juncture, the UE 704 sends the network 706 an RRC resume request message 724, as illustrated. After the RRC resume request message 724, the UE 704 may perform one or more actions 726. In at least some cases, after sending the RRC resume request message 724, the UE 704 continues to the receive the multicast data traffic 722 of the MBS session according to the RRC inactive mode PTM configuration. Further, the UE may prepare to resume the RRC connected mode MBS configuration (e.g., the RRC connected mode PTM configuration) that may have been previously stored at the UE (e.g., as was described in relation to how the UE 704 reacts 716 in response to the RRC release message 712).

The network 706 then responds to the RRC resume request message 724 by sending the UE 704 an RRC resume message 728. In response to the RRC resume message 728, the UE re-enters the RRC connected mode 708, as illustrated. After re-entering the RRC connected mode 708, the UE uses an RRC connected mode PTM configuration (e.g., either resumes a prior such connection from storage or a uses new such configuration that is, for example, provided in the RRC resume message 728) to receive the multicast data traffic of the MBS session.

Note that the flow diagram 702 of FIG. 7 is provided by way of example and not by way of limitation. As will be understood with reference to materials herein, various deviations from the flow diagram 702 that nevertheless remain within the scope of this disclosure are contemplated. Embodiments of PTM Configuration Maintenance Various proposals with respect to the maintenance/continuity of a PTM configuration for multicast data traffic of an MBS session across an RRC connected mode and an RRC inactive mode are now discussed.

Discussion relates to the use of both an RRC connected mode PTM configuration (that is used by a UE to receive multicast data traffic of the MBS session while the UE is in an RRC connected mode) and an RRC inactive mode PTM configuration (that is used by the UE to receive the multicast data traffic of the MBS session while the UE is in an RRC inactive mode). In some cases, the UE may store (in an access stratum (AS) context) an RRC connected mode PTM configuration that was previously applicable upon entering an RRC inactive mode and switching to an RRC inactive mode PTM configuration. This may enable the UE to later resume the use of the stored RRC connected mode PTM configuration (e.g., upon re-entering the RRC connected mode). In other cases, the UE may be configured to only maintain one PTM configuration—in which case the UE releases the RRC connected mode PTM configuration upon receiving and applying the RRC inactive mode PTM configuration.

Figures 8A, 8B:
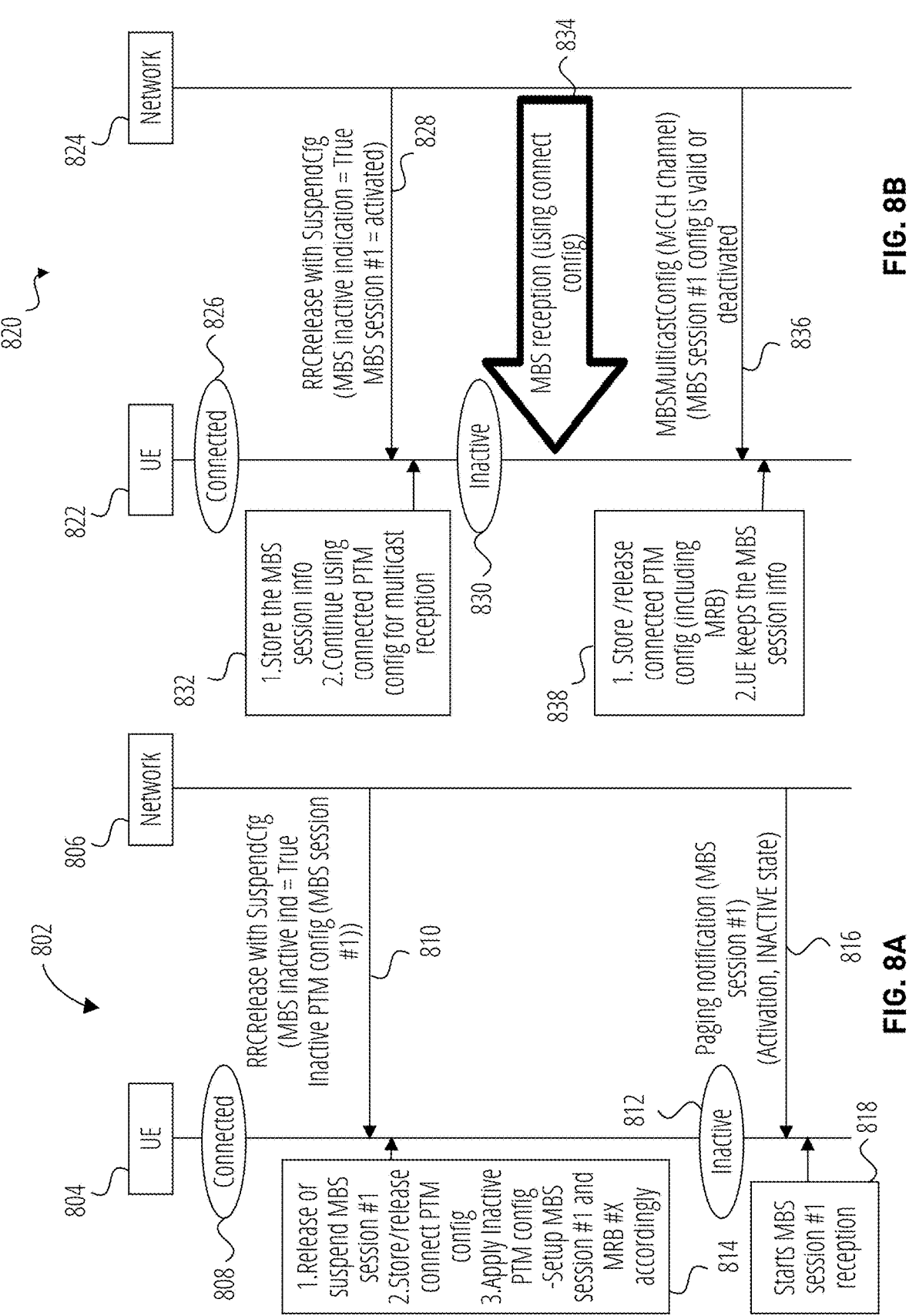
FIG. 8A illustrates a flow diagram for of a method for service continuity for data traffic of an MBS multicast service between a UE and a network, according to embodiments herein.
FIG. 8B illustrates a flow diagram for of a method for service continuity for data traffic of an MBS multicast service between a UE and a network, according to embodiments herein.

FIG. 8A illustrates a flow diagram 802 for of a method for service continuity for data traffic of an MBS multicast service between a UE 804 and a network 806, according to embodiments herein.

Preliminarily, the UE 804 begins in an RRC connected mode 808. The network 806 then sends the UE 804 an RRC release message 810. This RRC release message 810 may include a configuration suspension indication, as illustrated. In response to the RRC release message 810, the UE 804 will enter the RRC inactive mode 812.

The RRC release message 810 includes an indication that the UE 804 is to continue to receive multicast data traffic of the MBS session while in the RRC inactive mode 812. Further, the RRC release message 810 includes an RRC inactive mode PTM configuration that the UE is to use to receive multicast data traffic of the MBS session while the UE 804 is in the RRC inactive mode 812. As illustrated, this RRC inactive mode PTM configuration may identify itself as corresponding to the MBS session under discussion (note that the MBS session in question is denoted "MBS session #1" in FIG. 8A).

Upon receiving the RRC release message 810, the UE 804 reacts 814 in one or more ways. First, the UE 804 may release or suspend the MBS session according to the receipt of multicast data traffic of the MBS session using the RRC connected mode PTM configuration for the MBS session. Then, the UE 804 may either release or store the RRC connected mode PTM configuration. Finally, the UE 704 applies the RRC inactive mode PTM configuration (including any MBS session information in that RRC inactive mode PTM configuration). This results in the setup of the MBS session in question (again, the "MBS session #1") according to the receipt of multicast data traffic of the MBS session using the RRC inactive mode PTM configuration for the MBS session (e.g., as was received in the RRC release message 810).

Note that in cases where the RRC inactive mode PTM configuration indicates either an MRB ID that identifies a same MRB of the RRC connected mode PTM configuration or an MRB ID that is different than but associated with an MRB of the RRC connected mode PTM configuration, the UE 804 may arrange to use the identified MRB (and associated PDCP configuration and context) for reception of multicast data traffic of the MBS session while the UE is in the RRC inactive mode 812.

After the UE 804 is in the RRC inactive mode 812, the network 806 provides the UE 804 with a paging notification 816. The paging notification 816, as illustrated, identifies the MBS session and indicates to the UE to activate the RRC inactive mode PTM configuration for the MBS session such that multicast data traffic of the MBS session may be received by the UE 804 while the UE 804 is in the RRC inactive mode.

In response, the UE 804 starts 818 to receive data traffic of the MBS session using the RRC inactive mode PTM configuration.

It is contemplated that in case where a UE cannot/does not acquire a PTM configuration for a new RRC mode, the UE may continue using a PTM configuration for the previous RRC mode for multicast reception (in the case that the multicast session is activated while in the new RRC mode). For example, when a UE enters an RRC inactive mode and a network does not provide an RRC inactive mode PTM configuration in an RRC release message, the UE may continue using an (e.g., in use) RRC connected mode PTM configuration for the reception of the multicast data traffic until such a time as the UE receives a new PTM configuration (e.g., receives an RRC inactive mode PTM configuration) via an MCCH channel or some other further indication.

FIG. 8B illustrates a flow diagram 820 for of a method for service continuity for data traffic of an MBS multicast service between a UE 822 and a network 824, according to embodiments herein. Preliminarily, the UE 822 begins in an RRC connected mode 826.

The network 824 then sends the UE 822 an RRC release message 828. This RRC release message 828 may include a configuration suspension indication, as illustrated. In response to the RRC release message 828, the UE 822 will enter the RRC inactive mode 830.

The RRC release message 828 includes an indication that the UE 822 is to continue to receive multicast data traffic of the MBS session while in the RRC inactive state. Further, the RRC release message 810 includes an identification of the MBS session (note that the MBS session in question is denoted "MBS session #1" in FIG. 8B).

Note, however, that the RRC release message 828 of FIG. 8B does not include an RRC inactive mode PTM configuration that the UE is to use to receive multicast data traffic of the MBS session while the UE 804 is in the RRC inactive mode 812.

Upon receiving the RRC release message 828, the UE 822 reacts 832 in one or more ways. First, the UE 804 may store the applicable MBS session information. Further, the UE arranges to continue to use the RRC connected mode PTM configuration while in the RRC inactive mode 830.

Accordingly, as illustrated, after the UE 822 enters the RRC inactive mode 830, the UE 822 performs reception 834 of multicast data traffic of the MBS session using the RRC connected mode configuration (that was used when the UE was in the RRC connected mode 826).

Sometime later, the network 824 sends the UE 822 an MBS multicast configuration message 836 on an MCCH cannel that instructs the UE whether the configuration for the MBS session (e.g., the RRC connected mode PTM configuration) is valid (should be continued to be used) or should be inactivated. Note that in other unillustrated embodiments, it is contemplated that the MBS multicast configuration message 836 could be used to present a newly-provided RRC inactive mode PTM configuration for use for receiving multicast data traffic of the MBS session corresponding to the RRC inactive mode of the UE going forward (which may be the same or different from the RRC connected mode PTM configuration).

In response to the MBS multicast configuration message 836, the UE 822 may respond 838 by storing or releasing RRC connected mode PTM configuration (including in some cases any relevant MRB information). Further, the UE may keep the MBS session information for the MBS session at this juncture.

As is described herein, across various cases, it may be understood that when a UE that is in an RRC inactive state initiates an RRC resume procedure, the UE may continue using an RRC inactive mode PTM configuration for reception of multicast data traffic prior to actually (re-) entering an RRC connected mode.

Figure 9:
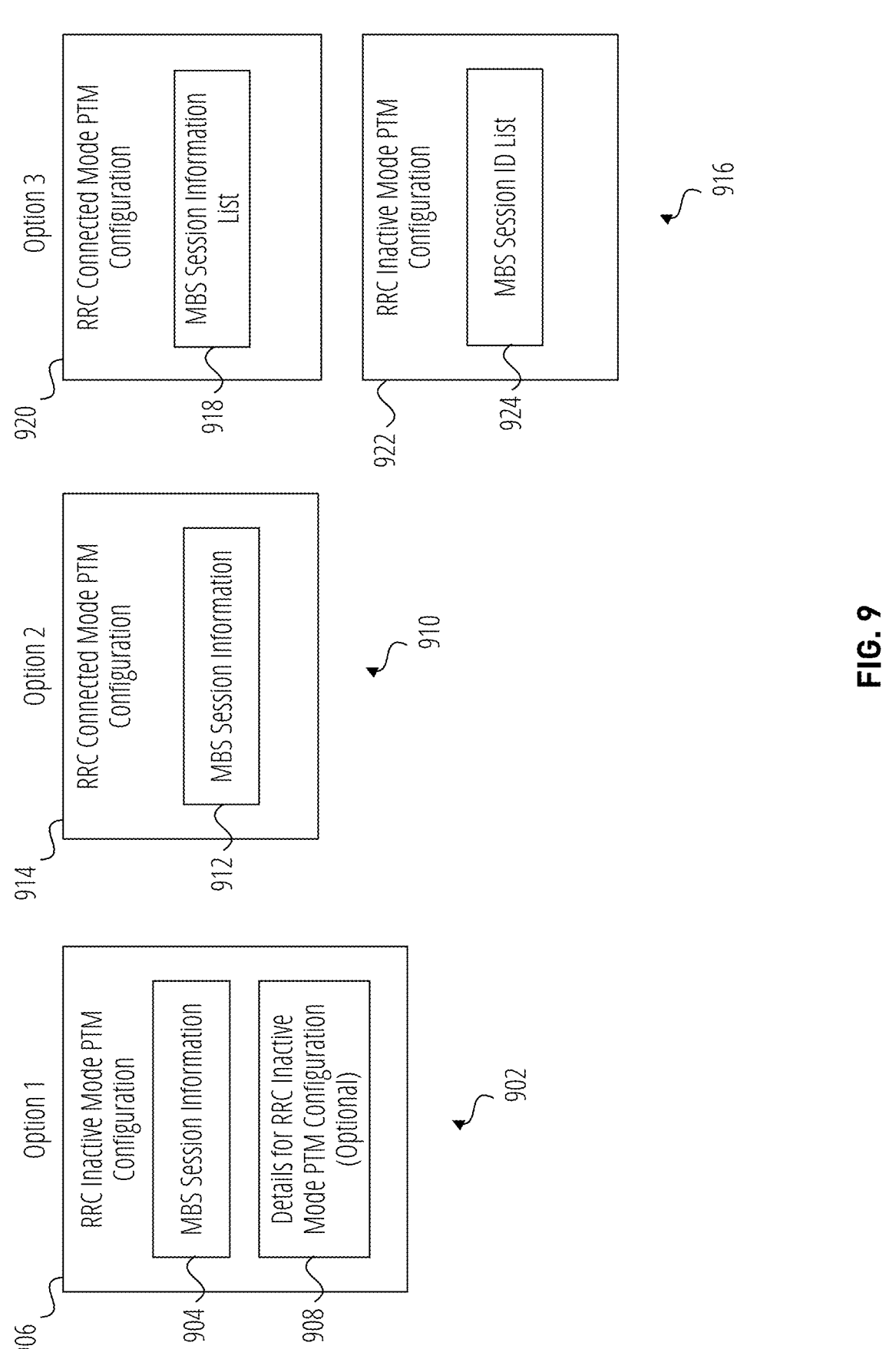
FIG. 9 illustrates various options for communicating MBS session information from a network to a UE, according to embodiments discussed herein.

Embodiments of Providing MBS Session Information for RRC Inactive Mode Multicast Data Traffic Reception FIG. 9 illustrates various options 902, 910, and 916 for communicating MBS session information from a network to a UE, according to embodiments discussed herein.

In a first option 902, ("Option 1"), the network provides MBS session information 904 for use by the UE for multicast data traffic reception during an RRC inactive mode in an RRC inactive mode PTM configuration 906 in an RRC release message. As illustrated, under this first option, the RRC inactive mode PTM configuration 906 may further include additional details 908 regarding the RRC inactive mode PTM configuration (e.g., in addition to the MBS session information 904).

In a second option 910, ("Option 2"), the network provides MBS session information 912 for use by the UE for multicast data traffic reception during an RRC inactive mode in an RRC connected mode PTM configuration 914. The RRC connected mode PTM configuration 914 may be delivered to the UE while the UE is in an RRC connected mode and prior to any RRC release message instructing the UE to enter the RRC inactive mode. Then, when the UE later receives an RRC release message, the UE may assume the use of the MBS session information 912 as was received in the RRC connected mode PTM configuration 914 (rather than, e.g., expecting that the RRC release message provides MBS session information). Note that in some embodiments under the second option 910, when the network enables RRC inactive mode multicast data traffic reception, the UE may assume that all previously configured MBS sessions are used/useable for such reception purposes.

A third option 916 ("Option 3") may in some ways be conceived as a hybrid or combination of the first option 902 and the second option 910. Under the third option 916, the network provides an MBS session information list 918 having one or more sets of MBS session information in an RRC connected mode PTM configuration 920 (e.g., via RRC dedicated signaling). Then, the network sends an RRC release message having an RRC inactive mode PTM configuration 922 to the UE that includes an MBS session ID list 924. This MBS session ID list 924 identifies one or more of the sets of MBS session information previously received in the MBS session information list 918 of the RRC connected mode PTM configuration, thereby identifying the set(s) of MBS session information from the MBS session information list 918 to use with respect to multicast data reception while the UE is in the RRC inactive mode.

Embodiments of MBS Session Level Service Continuity, MRB Level Service Continuity Various levels of service continuity for receiving multicast data traffic of an MBS session at a UE that may be used across a transition of the UE from an RRC connected mode to an RRC inactive mode are now discussed.

In a first option, such service continuity is maintained at an MBS session level (but not necessarily, for example, at an MRB level). Attendant to the transition from the RRC connected mode to the RRC inactive mode, the UE uses applicable MBS session information (however received) to maintain an SDAP entity for the MBS session across each of the RRC connected mode and the RRC inactive mode. Note that in such cases, it may be that an associated PDCP entity and MRB/RLC/logical channel (LCH) may be changed across the RRC mode transition.

In a second option, such service continuity is maintained at the MRB level (in addition to at the MBS session level). In such cases, the SDAP entity is maintained, as has been described. Further, in such cases, an MRB ID may be given in an RRC inactive mode PTM configuration that is provided to the UE (e.g., in an RRC release message). The UE then re-uses the identified MRB to receive multicast data traffic according to the MBS session while in the RRC inactive mode.

This represents a change within the scope of various understandings that assume that an RRC inactive mode PTM configuration in the MBS multicast service is to follow PTM configurations used by an MBS broadcast service, as in such MBS broadcast service mechanisms an MRB ID for the corresponding broadcast data traffic is selected by UE rather than indicated by the network.

Under the second option, in the RRC inactive mode PTM configuration, the network provides all the associated MRB ID information. The UE will use this information to release the MRB with respect to the RRC connected mode and then setup (e.g., re-use) the MRB with respect to the RRC inactive mode.

In cases where a provided MRB ID for the RRC inactive mode in the RRC inactive mode PTM configuration is for the MRB that was previously in use per the (prior) RRC connected mode PTM configuration, the UE may assume/maintain/re-use the previously existing PDCP context corresponding to that MRB for multicast data traffic reception across both the RRC connected mode and the RRC inactive mode.

Various cases may be considered within the framework of the second option (when the applicable MRB ID is the same across the RRC connected mode and the RRC inactive mode). In a first case, the UE assumes that the existing MRB of the prior RRC connected mode PTM configuration with the same MRB ID as indicated in the RRC inactive mode PTM configuration can continue/be re-used to perform the reception based on existing context (e.g., as just discussed).

In a second case when the applicable MRB ID is the same across the RRC connected mode and the RRC inactive mode, it may be that rather than the UE making the assumption as described, the network instead explicitly indicates to the UE whether to continue using/re-use the existing MRB configuration and/or context. It may be noted that if the explicit indication is absent under some UE configurations for this second case, in at least some embodiments the UE may fall back to making the assumption from the first case as described.

In a third case, it may be up to a UE implementation to decide whether to continue multicast data traffic reception using/re-using the existing MRB or whether to establish a new MRB for multicast reception in cases where the when the applicable MRB ID is the same across the RRC connected mode and the RRC inactive mode.

FIG. 10 illustrates a method 1000 of a UE, according to embodiments discussed herein. The method 1000 includes receiving 1002, from a network, while in an RRC connected mode, an RRC release message comprising an RRC inactive mode PTM configuration for the UE that uses an MBS session to receive multicast data traffic from the network while the UE is in an RRC inactive mode. The method 1000 further includes entering 1004 the RRC inactive mode from the RRC connected mode in response to the RRC release message. The method 1000 further includes using 1006 the RRC inactive mode PTM configuration to receive, from the network, the multicast data traffic of the MBS session while the UE is in the RRC inactive mode; wherein a same SDAP entity used to receive the multicast data traffic of the MBS session while the UE is in the RRC connected mode is used to receive the multicast data traffic while the UE is in the RRC inactive mode.

In some embodiments of the method 1000, the RRC inactive mode PTM configuration further comprises a first MRB ID of a first MRB of the MBS session for receiving the multicast data traffic while the UE is in the RRC inactive mode. In some such embodiments, the method 1000 further includes determining, based on the MRB ID, that the first MRB is used to receive the multicast data traffic from the network while the UE is in the RRC connected mode; and re-using the first MRB as used in the RRC connected mode to receive the multicast data traffic while the UE is in the RRC inactive mode. In some such embodiments, the first MRB is used to receive the multicast data traffic from the network while the UE is in the RRC connected mode; and the method 1000 further includes: receiving, from the network, an indication to reuse the first MRB as used in the RRC connected mode to receive the multicast data traffic on the first MRB while the UE is in the RRC inactive mode; and re-using, in response to the indication, the first MRB as used in the RRC connected mode to receive the multicast data traffic while the UE is in the RRC inactive mode.

In some embodiments, the method 1000 further includes receiving, from the network, while the UE is in the RRC inactive mode, a paging message corresponding to the MBS session.

In some embodiments of the method 1000, the RRC release message further comprises an indication to receive the multicast data traffic while the UE is in the RRC inactive mode.

In some embodiments, the method 1000 further includes storing an RRC connected mode PTM configuration used for receiving the multicast data traffic while the UE is in the RRC connected mode; re-entering the RRC connected mode from the RRC inactive mode; and using the stored RRC connected mode PTM configuration to receive, from the network, the multicast data traffic of the MBS session after re-entering the RRC connected mode.

In some embodiments of the method 1000, the RRC inactive mode PTM configuration comprises MBS session information for the MBS session.

In some embodiments, the method 1000 further includes using MBS session information configured to the UE while the UE is in the RRC connected mode for the MBS session while the UE is in the RRC inactive mode.

In some embodiments, the method 1000 further includes receiving, from the network, while the UE is in the RRC connected mode, MBS session information for each of a set of MBS sessions that comprises the MBS session, and wherein the RRC inactive mode PTM configuration comprises an MBS session ID that identifies the MBS session from the set of MBS sessions.

FIG. 11 illustrates a method 1100 of a RAN, according to embodiments discussed herein. The method 1100 includes sending 1102, to a UE in an RRC connected mode, an RRC release message comprising an RRC inactive mode PTM configuration for the UE that uses an MBS session to receive multicast data traffic from the network while the UE is in an RRC inactive mode. The method 1100 further includes transmitting 1104 the multicast data traffic of the MBS session to the UE while the UE is in the RRC inactive mode; wherein a same SDAP entity used to transmit the multicast data traffic of the MBS session while the UE is in the RRC connected mode is used to transmit the multicast data traffic while the UE is in the RRC inactive mode.

In some embodiments of the method 1100, the RRC inactive mode PTM configuration further comprises a first MRB ID of a first MRB of the MBS session for receiving the multicast data traffic while the UE is in the RRC inactive mode. In some such embodiments, the method 1100 further includes sending, to the UE, an indication to reuse the first MRB as used in the RRC connected mode to receive the multicast data traffic on the first MRB while the UE is in the RRC inactive mode.

In some embodiments, the method 1100 further includes sending, to the UE, while the UE is in the RRC inactive mode, a paging message corresponding to the MBS session.

In some embodiments of the method 1100, the RRC release message further comprises an indication for the UE to receive the multicast data traffic while the UE is in the RRC inactive mode.

In some embodiments of the method 1100, the RRC inactive mode PTM configuration comprises MBS session information for the MBS session.

In some embodiments, the method 1100 further includes sending, to the UE, while the UE is in the RRC connected mode, MBS session information for the MBS session.

In some embodiments, the method 1100 further includes sending, to the UE, while the UE is in the RRC connected mode, MBS session information for each of a set of MBS sessions that comprises the MBS session, and wherein the RRC inactive mode PTM configuration comprises an MBS session ID that identifies the MBS session from the set of MBS sessions.

FIG. 12 illustrates a method 1200 of a UE, according to embodiments discussed herein. The method 1200 includes using 1202 an RRC connected mode PTM configuration that uses an MBS session to receive multicast data traffic from a network while the UE is in an RRC connected mode. The method 1200 further includes receiving 1204, from the network, while the UE is in the RRC connected mode, an RRC release message. The method 1200 further includes entering 1206 an RRC inactive mode from the RRC connected mode in response to the RRC release message. The method 1200 further includes using 1208 the RRC connected mode PTM configuration to receive, from the network, the multicast data traffic of the MBS session while the UE is in the RRC inactive mode.

In some embodiments of the method 1200, a same MRB is used in the MBS session to receive the multicast data traffic of the MBS session while the UE is in each of the RRC connected mode and the RRC inactive mode.

In some embodiments, the method 1200 further includes receiving, from the network, an RRC inactive mode PTM configuration that uses the MBS session while the UE is in the RRC inactive mode; and using the RRC inactive mode PTM configuration to receive, from the network, the multicast data traffic of the MBS session while the UE is in the RRC inactive mode. In some such embodiments, the method 1200 further includes storing the RRC connected mode PTM configuration; re-entering, in response to an RRC resume message from the network, the RRC connected mode from the RRC inactive mode; and using the stored RRC connected mode PTM configuration to receive, from the network, the multicast data traffic of the MBS session after re-entering the RRC connected mode. In some such embodiments, the method 1200 further includes receiving an RRC resume message from the network while the UE is in the RRC inactive mode; and using, after receiving the RRC resume message, the RRC inactive mode PTM configuration to receive the data traffic of the MBS session until the UE resumes the RRC connected mode.

FIG. 13 illustrates a method 1300 of a RAN, according to embodiments discussed herein. The method 1300 includes sending 1302, to a UE in an RRC connected mode using an RRC connected mode PTM configuration that uses an MBS session to receive multicast data traffic from a network while the UE is in the RRC connected mode, an RRC release message. The method 1300 further includes transmitting 1304 the multicast data traffic of the MBS session to the UE while the UE is in the RRC inactive mode.

In some embodiments of the method 1300, a same MRB is used in the MBS session to receive the multicast data traffic of the MBS session while the UE is in each of the RRC connected mode and the RRC inactive mode.

In some embodiments, the method 1300 further includes sending, to the UE, an RRC inactive mode PTM configuration that uses the MBS session while the UE is in the RRC inactive mode.

Figure 14:
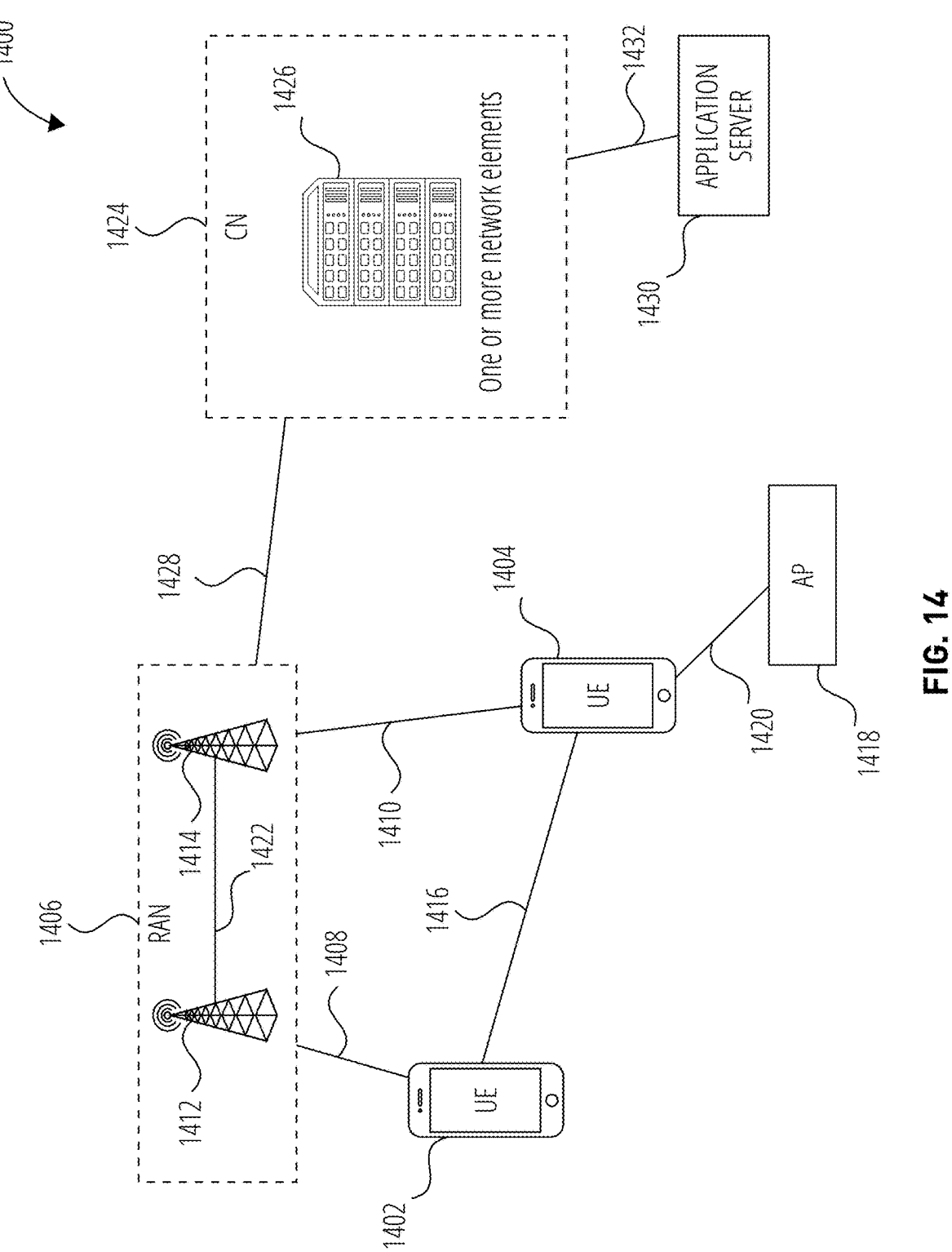
FIG. 14 illustrates an example architecture of a wireless communication system, according to embodiments disclosed herein.

FIG. 14 illustrates an example architecture of a wireless communication system 1400, according to embodiments disclosed herein. The following description is provided for an example wireless communication system 1400 that operates in conjunction with the LTE system standards and/or 5G or NR system standards as provided by 3GPP technical specifications.

As shown by FIG. 14, the wireless communication system 1400 includes UE 1402 and UE 1404 (although any number of UEs may be used). In this example, the UE 1402 and the UE 1404 are illustrated as smartphones (e.g., handheld touchscreen mobile computing devices connectable to one or more cellular networks), but may also comprise any mobile or non-mobile computing device configured for wireless communication.

The UE 1402 and UE 1404 may be configured to communicatively couple with a RAN 1406. In embodiments, the RAN 1406 may be NG-RAN, E-UTRAN, etc. The UE 1402 and UE 1404 utilize connections (or channels) (shown as connection 1408 and connection 1410, respectively) with the RAN 1406, each of which comprises a physical communications interface. The RAN 1406 can include one or more base stations (such as base station 1412 and base station 1414) that enable the connection 1408 and connection 1410.

In this example, the connection 1408 and connection 1410 are air interfaces to enable such communicative coupling, and may be consistent with RAT(s) used by the RAN 1406, such as, for example, an LTE and/or NR.

In some embodiments, the UE 1402 and UE 1404 may also directly exchange communication data via a sidelink interface 1416. The UE 1404 is shown to be configured to access an access point (shown as AP 1418) via connection 1420. By way of example, the connection 1420 can comprise a local wireless connection, such as a connection consistent with any IEEE 802.11 protocol, wherein the AP 1418 may comprise a Wi-Fi® router. In this example, the AP 1418 may be connected to another network (for example, the Internet) without going through a CN 1424.

In embodiments, the UE 1402 and UE 1404 can be configured to communicate using orthogonal frequency division multiplexing (OFDM) communication signals with each other or with the base station 1412 and/or the base station 1414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1412 or base station 1414 may be implemented as one or more software entities running on server computers as part of a virtual network. In addition, or in other embodiments, the base station 1412 or base station 1414 may be configured to communicate with one another via interface 1422. In embodiments where the wireless communication system 1400 is an LTE system (e.g., when the CN 1424 is an EPC), the interface 1422 may be an X2 interface. The X2 interface may be defined between two or more base stations (e.g., two or more eNBs and the like) that connect to an EPC, and/or between two eNBs connecting to the EPC. In embodiments where the wireless communication system 1400 is an NR system (e.g., when CN 1424 is a 5GC), the interface 1422 may be an Xn interface. The Xn interface is defined between two or more base stations (e.g., two or more gNBs and the like) that connect to 5GC, between a base station 1412 (e.g., a gNB) connecting to 5GC and an eNB, and/or between two eNBs connecting to 5GC (e.g., CN 1424).

The RAN 1406 is shown to be communicatively coupled to the CN 1424. The CN 1424 may comprise one or more network elements 1426, which are configured to offer various data and telecommunications services to customers/subscribers (e.g., users of UE 1402 and UE 1404) who are connected to the CN 1424 via the RAN 1406. The components of the CN 1424 may be implemented in one physical device or separate physical devices including components to read and execute instructions from a machine-readable or computer-readable medium (e.g., a non-transitory machine-readable storage medium).

In embodiments, the CN 1424 may be an EPC, and the RAN 1406 may be connected with the CN 1424 via an S1 interface 1428. In embodiments, the S1 interface 1428 may be split into two parts, an S1 user plane (S1-U) interface, which carries traffic data between the base station 1412 or base station 1414 and a serving gateway (S-GW), and the S1-MME interface, which is a signaling interface between the base station 1412 or base station 1414 and mobility management entities (MMEs).

In embodiments, the CN 1424 may be a 5GC, and the RAN 1406 may be connected with the CN 1424 via an NG interface 1428. In embodiments, the NG interface 1428 may be split into two parts, an NG user plane (NG-U) interface, which carries traffic data between the base station 1412 or base station 1414 and a user plane function (UPF), and the S1 control plane (NG-C) interface, which is a signaling interface between the base station 1412 or base station 1414 and access and mobility management functions (AMFs).

Generally, an application server 1430 may be an element offering applications that use internet protocol (IP) bearer resources with the CN 1424 (e.g., packet switched data services). The application server 1430 can also be configured to support one or more communication services (e.g., VoIP sessions, group communication sessions, etc.) for the UE 1402 and UE 1404 via the CN 1424. The application server 1430 may communicate with the CN 1424 through an IP communications interface 1432.

Figure 15:
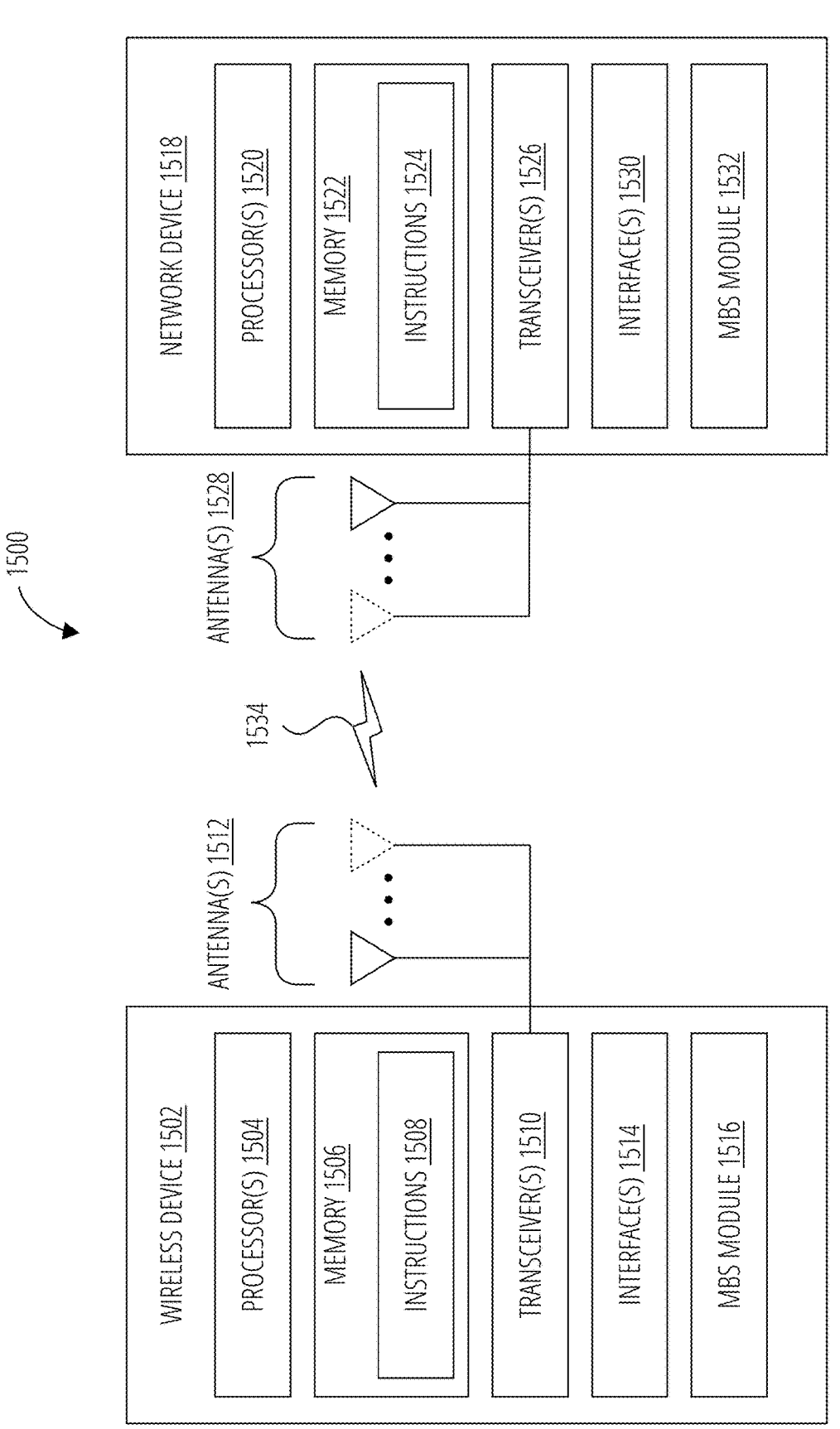
FIG. 15 illustrates a system for performing signaling between a wireless device and a network device, according to embodiments disclosed herein.

FIG. 15 illustrates a system 1500 for performing signaling 1534 between a wireless device 1502 and a network device 1518, according to embodiments disclosed herein. The system 1500 may be a portion of a wireless communications system as herein described. The wireless device 1502 may be, for example, a UE of a wireless communication system. The network device 1518 may be, for example, a base station (e.g., an eNB or a gNB) of a wireless communication system.

The wireless device 1502 may include one or more processor(s) 1504. The processor(s) 1504 may execute instructions such that various operations of the wireless device 1502 are performed, as described herein. The processor(s) 1504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1502 may include a memory 1506. The memory 1506 may be a non-transitory computer-readable storage medium that stores instructions 1508 (which may include, for example, the instructions being executed by the processor(s) 1504). The instructions 1508 may also be referred to as program code or a computer program. The memory 1506 may also store data used by, and results computed by, the processor(s) 1504.

The wireless device 1502 may include one or more transceiver(s) 1510 that may include radio frequency (RF) transmitter circuitry and/or receiver circuitry that use the antenna(s) 1512 of the wireless device 1502 to facilitate signaling (e.g., the signaling 1534) to and/or from the wireless device 1502 with other devices (e.g., the network device 1518) according to corresponding RATs.

The wireless device 1502 may include one or more antenna(s) 1512 (e.g., one, two, four, or more). For embodiments with multiple antenna(s) 1512, the wireless device 1502 may leverage the spatial diversity of such multiple antenna(s) 1512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1502 may be accomplished according to precoding (or digital beamforming) that is applied at the wireless device 1502 that multiplexes the data streams across the antenna(s) 1512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1502 may implement analog beamforming techniques, whereby phases of the signals sent by the antenna(s) 1512 are relatively adjusted such that the (joint)

transmission of the antenna(s) 1512 can be directed (this is sometimes referred to as beam steering).

The wireless device 1502 may include one or more interface(s) 1514. The interface(s) 1514 may be used to provide input to or output from the wireless device 1502. For example, a wireless device 1502 that is a UE may include interface(s) 1514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1510/antenna(s) 1512 already described) that allow for communication between the UE and other devices and may operate according to known protocols (e.g., Wi-Fi®), Bluetooth®, and the like).

The wireless device 1502 may include an MBS module 1516. The MBS module 1516 may be implemented via hardware, software, or combinations thereof. For example, the MBS module 1516 may be implemented as a processor, circuit, and/or instructions 1508 stored in the memory 1506 and executed by the processor(s) 1504. In some examples, the MBS module 1516 may be integrated within the processor(s) 1504 and/or the transceiver(s) 1510. For example, the MBS module 1516 may be implemented by a combination of software components (e.g., executed by a DSP or a general processor) and hardware components (e.g., logic gates and circuitry) within the processor(s) 1504 or the transceiver(s) 1510.

The MBS module 1516 may be used for various aspects of the present disclosure, for example, aspects of FIG. 1A through FIG. 13 The MBS module 1516 may be configured to, for example, cause the wireless device 1502 to receive, from a network (e.g., from a network device 1518 that is a base station of the network), while in an RRC connected mode, an RRC release message comprising an RRC inactive mode PTM configuration for the wireless device 1502 that uses an MBS session to receive multicast data traffic from the network while the wireless device 1502 is in an RRC inactive mode; to enter the RRC inactive mode from the RRC connected mode in response to the RRC release message; and to use the RRC inactive mode PTM configuration to receive, from the network, the multicast data traffic of the MBS session while the wireless device 1502 is in the RRC inactive mode; wherein a same SDAP entity used to receive the multicast data traffic of the MBS session while the UE is in the RRC connected mode is used to receive the multicast data traffic while the UE is in the RRC inactive mode. The MBS module 1516 may be configured to, for example, cause the wireless device 1502 to use an RRC connected mode PTM configuration that uses an MBS session to receive multicast data traffic from a network (e.g., from a network device 1518 that is a base station of the network) while the UE is in an RRC connected mode; to receive, from the network, while the wireless device 1502 is in the RRC connected mode, an RRC release message; to enter an RRC inactive mode from the RRC connected mode in response to the RRC release message; and to use the RRC connected mode PTM configuration to receive, from the network, the multicast data traffic of the MBS session while the wireless device 1502 is in the RRC inactive mode.

The network device 1518 may include one or more processor(s) 1520. The processor(s) 1520 may execute instructions such that various operations of the network device 1518 are performed, as described herein. The processor(s) 1520 may include one or more baseband processors implemented using, for example, a CPU, a DSP, an ASIC, a controller, an FPGA device, another hardware device, a firmware device, or any combination thereof configured to perform the operations described herein.

The network device 1518 may include a memory 1522. The memory 1522 may be a non-transitory computer-readable storage medium that stores instructions 1524 (which may include, for example, the instructions being executed by the processor(s) 1520). The instructions 1524 may also be referred to as program code or a computer program. The memory 1522 may also store data used by, and results computed by, the processor(s) 1520.

The network device 1518 may include one or more transceiver(s) 1526 that may include RF transmitter circuitry and/or receiver circuitry that use the antenna(s) 1528 of the network device 1518 to facilitate signaling (e.g., the signaling 1534) to and/or from the network device 1518 with other devices (e.g., the wireless device 1502) according to corresponding RATs.

The network device 1518 may include one or more antenna(s) 1528 (e.g., one, two, four, or more). In embodiments having multiple antenna(s) 1528, the network device 1518 may perform MIMO, digital beamforming, analog beamforming, beam steering, etc., as has been described.

The network device 1518 may include one or more interface(s) 1530. The interface(s) 1530 may be used to provide input to or output from the network device 1518. For example, a network device 1518 that is a base station may include interface(s) 1530 made up of transmitters, receivers, and other circuitry (e.g., other than the transceiver(s) 1526/antenna(s) 1528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1518 may include an MBS module 1532. The MBS module 1532 may be implemented via hardware, software, or combinations thereof. For example, the MBS module 1532 may be implemented as a processor, circuit, and/or instructions 1524 stored in the memory 1522 and executed by the processor(s) 1520. In some examples, the MBS module 1532 may be integrated within the processor(s) 1520 and/or the transceiver(s) 1526. For example, the MBS module 1532 may be implemented by a combination of software components (e.g., executed by a DSP or a general processor) and hardware components (e.g., logic gates and circuitry) within the processor(s) 1520 or the transceiver(s) 1526.

The MBS module 1532 may be used for various aspects of the present disclosure, for example, aspects of FIG. 1A through FIG. 13. The MBS module 1532 may be configured to cause the network device 1518 to send, to a UE (e.g., the wireless device 1502) in an RRC connected mode, an RRC release message comprising an RRC inactive mode PTM configuration for the UE that uses a MBS session to receive multicast data traffic from the network while the UE is in an RRC inactive mode, and to transmit the multicast data traffic of the MBS session to the UE while the UE is in the RRC inactive mode; wherein a same SDAP entity used to transmit the multicast data traffic of the MBS session while the UE is in the RRC connected mode is used to transmit the multicast data traffic while the UE is in the RRC inactive mode. The MBS module 1532 may be configured to cause the network device 1518 to send, to a UE (e.g., the wireless device 1502) in an RRC connected mode using an RRC connected mode PTM configuration that uses an MBS session to receive multicast data traffic from a network while the UE is in the RRC connected mode, an RRC release message; and to transmit the multicast data traffic of the MBS session to the UE while the UE is in the RRC inactive mode.

Embodiments contemplated herein include an apparatus comprising means to perform one or more elements of any of the method 1000 and/or the method 1200. This apparatus may be, for example, an apparatus of a UE (such as a wireless device 1502 that is a UE, as described herein).

Embodiments contemplated herein include one or more non-transitory computer-readable media comprising instructions to cause an electronic device, upon execution of the instructions by one or more processors of the electronic device, to perform one or more elements of any of the method 1000 and/or the method 1200. This non-transitory computer-readable media may be, for example, a memory of a UE (such as a memory 1506 of a wireless device 1502 that is a UE, as described herein).

Embodiments contemplated herein include an apparatus comprising logic, modules, or circuitry to perform one or more elements of any of the method 1000 and/or the method 1200. This apparatus may be, for example, an apparatus of a UE (such as a wireless device 1502 that is a UE, as described herein).

Embodiments contemplated herein include an apparatus comprising: one or more processors and one or more computer-readable media comprising instructions that, when executed by the one or more processors, cause the one or more processors to perform one or more elements of any of the method 1000 and/or the method 1200. This apparatus may be, for example, an apparatus of a UE (such as a wireless device 1502 that is a UE, as described herein).

Embodiments contemplated herein include a signal as described in or related to one or more elements of any of the method 1000 and/or the method 1200.

Embodiments contemplated herein include a computer program or computer program product comprising instructions, wherein execution of the program by a processor is to cause the processor to carry out one or more elements of any of the method 1000 and/or the method 1200. The processor may be a processor of a UE (such as a processor(s) 1504 of a wireless device 1502 that is a UE, as described herein). These instructions may be, for example, located in the processor and/or on a memory of the UE (such as a memory 1506 of a wireless device 1502 that is a UE, as described herein).

Embodiments contemplated herein include an apparatus comprising means to perform one or more elements of any of the method 1100 and/or the method 1300. This apparatus may be, for example, an apparatus of a base station (such as a network device 1518 that is a base station, as described herein).

Embodiments contemplated herein include one or more non-transitory computer-readable media comprising instructions to cause an electronic device, upon execution of the instructions by one or more processors of the electronic device, to perform one or more elements of any of the method 1100 and/or the method 1300. This non-transitory computer-readable media may be, for example, a memory of a base station (such as a memory 1522 of a network device 1518 that is a base station, as described herein).

Embodiments contemplated herein include an apparatus comprising logic, modules, or circuitry to perform one or more elements of any of the method 1100 and/or the method 1300. This apparatus may be, for example, an apparatus of a base station (such as a network device 1518 that is a base station, as described herein).

Embodiments contemplated herein include an apparatus comprising: one or more processors and one or more computer-readable media comprising instructions that, when executed by the one or more processors, cause the one or more processors to perform one or more elements of any of the method 1100 and/or the method 1300. This apparatus may be, for example, an apparatus of a base station (such as a network device 1518 that is a base station, as described herein).

Embodiments contemplated herein include a signal as described in or related to one or more elements of any of the method 1100 and/or the method 1300.

Embodiments contemplated herein include a computer program or computer program product comprising instructions, wherein execution of the program by a processing element is to cause the processing element to carry out one or more elements of any of the method 1100 and/or the method 1300. The processor may be a processor of a base station (such as a processor(s) 1520 of a network device 1518 that is a base station, as described herein). These instructions may be, for example, located in the processor and/or on a memory of the base station (such as a memory 1522 of a network device 1518 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
receiving, from a network, while in a radio resource control (RRC) connected mode, an RRC release message comprising an RRC inactive mode point to multipoint (PTM) configuration for the UE that uses a multicast-broadcast services (MBS) session to receive multicast data traffic from the network while the UE is in an RRC inactive mode;
entering the RRC inactive mode from the RRC connected mode in response to the RRC release message; and
using the RRC inactive mode PTM configuration to receive, from the network, the multicast data traffic of the MBS session while the UE is in the RRC inactive mode;
wherein a same service data adaptation protocol (SDAP) entity used to receive the multicast data traffic of the MBS session while the UE is in the RRC connected mode is used to receive the multicast data traffic while the UE is in the RRC inactive mode.

2. The method of claim 1, wherein the RRC inactive mode PTM configuration further comprises a first MBS radio bearer (MRB) ID of a first MRB of the MBS session for receiving the multicast data traffic while the UE is in the RRC inactive mode.

3. The method of claim 2, further comprising:
determining, based on the MRB ID, that the first MRB is used to receive the multicast data traffic from the network while the UE is in the RRC connected mode; and
re-using the first MRB as used in the RRC connected mode to receive the multicast data traffic while the UE is in the RRC inactive mode.

4. The method of claim 2, wherein the first MRB is used to receive the multicast data traffic from the network while the UE is in the RRC connected mode; and further comprising:
receiving, from the network, an indication to reuse the first MRB as used in the RRC connected mode to receive the multicast data traffic on the first MRB while the UE is in the RRC inactive mode; and
re-using, in response to the indication, the first MRB as used in the RRC connected mode to receive the multicast data traffic while the UE is in the RRC inactive mode.

5. The method of claim 1, further comprising receiving, from the network, while the UE is in the RRC inactive mode, a paging message corresponding to the MBS session.

6. The method of claim 1, wherein the RRC release message further comprises an indication to receive the multicast data traffic while the UE is in the RRC inactive mode.

7. The method of claim 1, further comprising:
storing an RRC connected mode PTM configuration used for receiving the multicast data traffic while the UE is in the RRC connected mode;
re-entering the RRC connected mode from the RRC inactive mode; and
using the RRC connected mode PTM configuration to receive, from the network, the multicast data traffic of the MBS session after re-entering the RRC connected mode.

8. The method of claim 1, wherein the RRC inactive mode PTM configuration comprises MBS session information for the MBS session.

9. The method of claim 1, further comprising using MBS session information configured to the UE while the UE is in the RRC connected mode for the MBS session while the UE is in the RRC inactive mode.

10. The method of claim 1, further comprising receiving, from the network, while the UE is in the RRC connected mode, MBS session information for each of a set of MBS sessions that comprises the MBS session, and wherein the RRC inactive mode PTM configuration comprises an MBS session ID that identifies the MBS session from the set of MBS sessions.

11. A method of a radio access network (RAN), comprising:
sending, to a user equipment (UE) in a radio resource control (RRC) connected mode, an RRC release message comprising an RRC inactive mode point to multipoint (PTM) configuration for the UE that uses a multicast-broadcast services (MBS) session to receive multicast data traffic from the network while the UE is in an RRC inactive mode,
transmitting the multicast data traffic of the MBS session to the UE while the UE is in the RRC inactive mode;
wherein a same service data adaptation protocol (SDAP) entity used to transmit the multicast data traffic of the MBS session while the UE is in the RRC connected mode is used to transmit the multicast data traffic while the UE is in the RRC inactive mode.

12. The method of claim 11, wherein the RRC inactive mode PTM configuration further comprises a first MBS radio bearer (MRB) identifier (ID) of a first MRB of the MBS session for receiving the multicast data traffic while the UE is in the RRC inactive mode.

13. The method of claim 12, further comprising sending, to the UE, an indication to reuse the first MRB as used in the RRC connected mode to receive the multicast data traffic on the first MRB while the UE is in the RRC inactive mode.

14. The method of claim 11, further comprising sending, to the UE, while the UE is in the RRC inactive mode, a paging message corresponding to the MBS session.

15. The method of claim 11, wherein the RRC release message further comprises an indication for the UE to receive the multicast data traffic while the UE is in the RRC inactive mode.

16. The method of claim 11, wherein the RRC inactive mode PTM configuration comprises MBS session information for the MBS session.

17. The method of claim 11, further comprising sending, to the UE, while the UE is in the RRC connected mode, MBS session information for the MBS session.

18. The method of claim 11, further comprising sending, to the UE, while the UE is in the RRC connected mode, MBS session information for each of a set of MBS sessions that comprises the MBS session, and wherein the RRC inactive mode PTM configuration comprises an MBS session ID that identifies the MBS session from the set of MBS sessions.

19. A non-transitory computer-readable storage medium comprising instructions that, when executed by one or more processors of a user equipment (UE), cause the UE to:

receive, from a network, while in a radio resource control (RRC) connected mode, an RRC release message comprising an RRC inactive mode point to multipoint (PTM) configuration for the UE that uses a multicast-broadcast services (MBS) session to receive multicast data traffic from the network while the UE is in an RRC inactive mode;

enter the RRC inactive mode from the RRC connected mode in response to the RRC release message; and use the RRC inactive mode PTM configuration to receive, from the network, the multicast data traffic of the MBS session while the UE is in the RRC inactive mode;

wherein a same service data adaptation protocol (SDAP) entity used to receive the multicast data traffic of the MBS session while the UE is in the RRC connected mode is used to receive the multicast data traffic while the UE is in the RRC inactive mode.

20. The non-transitory computer-readable storage medium of claim 19, wherein the RRC inactive mode PTM configuration further comprises a first MBS radio bearer (MRB) ID of a first MRB of the MBS session for receiving the multicast data traffic while the UE is in the RRC inactive mode.

* * * * *